(12) United States Patent
Tarelli et al.

(10) Patent No.: US 11,527,946 B2
(45) Date of Patent: Dec. 13, 2022

(54) HAPTIC ACTUATOR HAVING A DOUBLE-WOUND DRIVING COIL FOR TEMPERATURE- AND DRIVING CURRENT-INDEPENDENT VELOCITY SENSING

(71) Applicant: Apple Inc., Cupertino, CA (US)

(72) Inventors: Riccardo Tarelli, San Francisco, CA (US); Yumeng Liu, Sunnyvale, CA (US); Shingo Yoneoka, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 16/900,718

(22) Filed: Jun. 12, 2020

(65) Prior Publication Data

US 2020/0412223 A1   Dec. 31, 2020

Related U.S. Application Data

(60) Provisional application No. 62/861,967, filed on Jun. 14, 2019.

(51) Int. Cl.
| | |
|---|---|
| *H02K 33/16* | (2006.01) |
| *H02K 33/14* | (2006.01) |
| *G01L 1/14* | (2006.01) |
| *H02P 23/14* | (2006.01) |
| *G01D 5/20* | (2006.01) |
| *H02K 1/34* | (2006.01) |
| *H02P 7/025* | (2016.01) |

(52) U.S. Cl.
CPC ............. *H02K 33/16* (2013.01); *G01D 5/204* (2013.01); *G01D 5/2046* (2013.01); *G01L 1/14* (2013.01); *H02K 1/34* (2013.01); *H02K 33/14* (2013.01); *H02P 7/025* (2016.02); *H02P 23/14* (2013.01); *G01D 5/20* (2013.01)

(58) Field of Classification Search
CPC ........ G01D 5/20; G01D 5/204; G01D 5/2046; G01L 1/14; H02K 1/34; H02K 33/14; H02K 33/16; H02P 23/14; H02P 7/025
USPC ........................................................ 318/114
See application file for complete search history.

(56) References Cited

U.S. PATENT DOCUMENTS

| | | | |
|---|---|---|---|
| 6,198,590 B1 | 3/2001 | Codilian et al. | |
| 8,618,791 B2 | 12/2013 | Grinberg et al. | |
| 9,179,066 B1 * | 11/2015 | Tsai | ................... H04N 5/23251 |
| 9,274,602 B2 * | 3/2016 | Garg | ....................... G06F 3/016 |
| 9,746,925 B2 | 8/2017 | Yoest et al. | |
| 9,810,550 B2 | 11/2017 | Goto | |

(Continued)

*Primary Examiner* — Rashad H Johnson
(74) *Attorney, Agent, or Firm* — Fish & Richardson P.C.

(57) ABSTRACT

A haptic engine includes a haptic actuator having a double-wound driving coil in which the two windings are connected with each other either in series or in parallel. By using the double-wound driving coil in which the two windings are connected with each other in series, an instant back EMF voltage induced in either of the two windings can be determined without having to measure in real time a resistance of the corresponding winding, and without having to sense a driving current through the double-wound driving coil. By using the double-wound driving coil in which the two windings are connected with each other in parallel, an instant back EMF voltage induced in either of the two windings can be determined without having to measure in real time a resistance of the corresponding winding.

44 Claims, 8 Drawing Sheets

(56) References Cited

U.S. PATENT DOCUMENTS

| | | | |
|---|---|---|---|
| 9,810,552 B2 | 11/2017 | Hunter et al. | |
| 9,841,442 B2* | 12/2017 | Yoshida | G01R 19/0092 |
| 9,995,715 B2 | 6/2018 | Goodbread | |
| 10,298,163 B2 | 5/2019 | Vasilev et al. | |
| 10,453,315 B1* | 10/2019 | Chen | G06F 3/016 |
| 11,169,607 B1* | 11/2021 | Tompkins | G06F 3/014 |
| 11,336,216 B1* | 5/2022 | Dementyev | H02P 25/034 |
| 2011/0037546 A1* | 2/2011 | Marie | G06F 3/016 |
| | | | 335/230 |
| 2011/0243537 A1* | 10/2011 | Wilson | H02P 23/0004 |
| | | | 388/847 |
| 2012/0249034 A1* | 10/2012 | Dooley | H02P 27/08 |
| | | | 318/400.35 |
| 2013/0002411 A1* | 1/2013 | Henderson | H02N 2/023 |
| | | | 340/407.1 |
| 2013/0314078 A1* | 11/2013 | Proksch | G01Q 10/04 |
| | | | 324/207.18 |
| 2014/0125471 A1 | 5/2014 | Organ et al. | |
| 2014/0321690 A1* | 10/2014 | Reining | H04R 9/02 |
| | | | 381/396 |
| 2015/0036124 A1* | 2/2015 | Onaran | G01D 5/20 |
| | | | 356/72 |
| 2016/0133410 A1* | 5/2016 | Bock | H01H 47/325 |
| | | | 361/160 |
| 2016/0134207 A1* | 5/2016 | Bock | H01H 9/26 |
| | | | 318/778 |
| 2016/0258758 A1* | 9/2016 | Houston | G01D 5/145 |
| 2017/0090573 A1* | 3/2017 | Hajati | G06F 3/016 |
| 2017/0110991 A1* | 4/2017 | Frampton | H02P 9/00 |
| 2017/0169674 A1* | 6/2017 | Macours | G08B 6/00 |
| 2017/0256145 A1* | 9/2017 | Macours | G08B 6/00 |
| 2017/0299408 A1* | 10/2017 | Kang | G02B 7/08 |
| 2017/0324308 A1* | 11/2017 | Pietromonaco | H02P 25/092 |
| 2018/0059793 A1 | 3/2018 | Hajati | |
| 2018/0181099 A1* | 6/2018 | Steinbach | H02P 27/08 |
| 2018/0292235 A1 | 10/2018 | Filatov | |
| 2018/0321748 A1* | 11/2018 | Rao | G06F 3/0414 |
| 2019/0295755 A1* | 9/2019 | Konradi | H01F 7/064 |
| 2019/0340896 A1* | 11/2019 | Phan Le | G06F 3/016 |
| 2020/0150767 A1* | 5/2020 | Karimi Eskandary | G06F 3/016 |
| 2020/0382113 A1* | 12/2020 | Beardsworth | H03K 17/14 |
| 2020/0412222 A1* | 12/2020 | Tarelli | H02P 25/22 |
| 2020/0412223 A1* | 12/2020 | Tarelli | H02P 7/025 |
| 2021/0074460 A1* | 3/2021 | Sen | G06F 1/1662 |
| 2021/0099062 A1* | 4/2021 | Tarelli | H01F 7/1638 |
| 2021/0149538 A1* | 5/2021 | Lapointe | H03K 17/962 |
| 2021/0152174 A1* | 5/2021 | Yancey | H03K 17/96 |
| 2021/0175831 A1* | 6/2021 | Chen | H02P 25/086 |
| 2021/0351728 A1* | 11/2021 | Pollock | H02P 6/185 |
| 2022/0181062 A1* | 6/2022 | Kordunsky | H01F 7/20 |
| 2022/0228888 A1* | 7/2022 | Goldman | G01D 5/24 |
| 2022/0239214 A1* | 7/2022 | Hagen | H02K 11/215 |

* cited by examiner

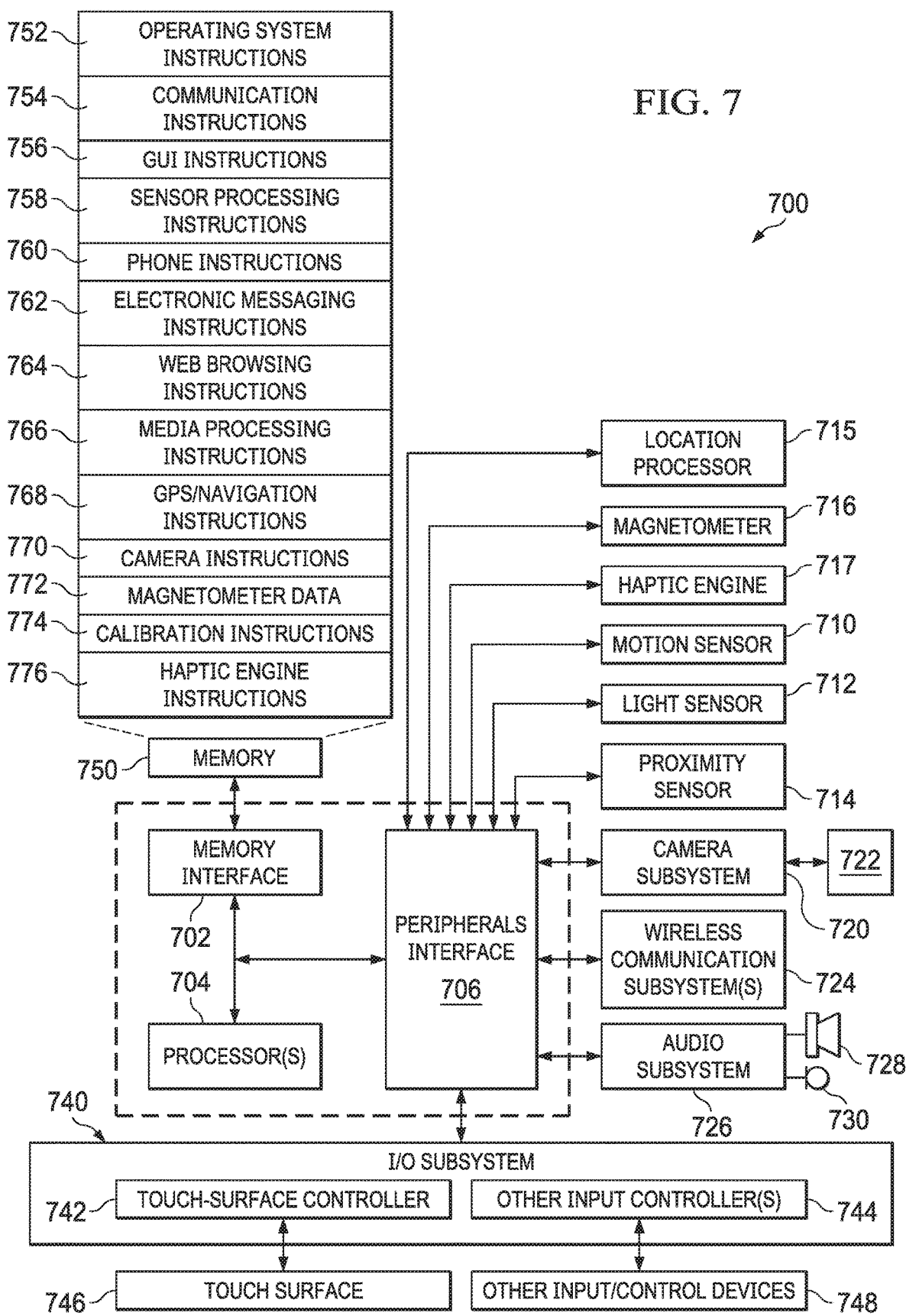

HAPTIC ACTUATOR HAVING A DOUBLE-WOUND DRIVING COIL FOR TEMPERATURE- AND DRIVING CURRENT-INDEPENDENT VELOCITY SENSING

CROSS-REFERENCE TO RELATED APPLICATIONS

This application claims the benefit of priority of U.S. Provisional Patent Application No. 62/861,967, filed Jun. 14, 2019, which provisional patent application is incorporated by reference herein in its entirety.

BACKGROUND

Technical Field

This specification relates generally to haptic engine architectures, and more specifically, to a haptic engine having a haptic actuator in which velocity of the actuator's moving mass is sensed, independently of both temperature and driving current, by using the actuator's double-wound driving coil.

Background

A haptic engine (also referred to as a vibration module) includes a haptic actuator in which a mass is driven using electromagnetic forces to move relative the haptic actuator's frame, at least, along a driving direction (e.g., through vibration back-and-forth along the driving direction). A haptic actuator can be implemented as a linear resonant actuator (LRA), a gap-closing actuator, a rotary actuator, a reluctance motor, etc. The haptic engine also includes circuitry for actuating the haptic actuator, e.g., to produce the electromagnetic forces responsible for moving the mass, and circuitry for determining one or more of acceleration, velocity and displacement of the moving mass. The haptic actuator can be configured with a driving coil that is arranged stationary to the haptic actuator's frame, and a mass that supports a magnet and is arranged to move relative to the driving coil along the driving direction. Alternatively, the haptic actuator can be configured with a magnet that is arranged stationary to the haptic actuator's frame, and a mass that supports a driving coil and is arranged to move relative to the magnet along the driving direction. In either configuration, a back electromotive force voltage, or simply bEMF, induced in the driving coil, or simply coil, is related to the velocity of the moving mass in the following manner.

For instance, when the haptic actuator is implemented as a LRA, a driving force F is related to a driving current in the following manner:

$$F_{Eng} = k_m I \quad (1),$$

where $k_m$ is a motor constant, and I is a driving current through the coil. As such, the motor constant $k_m$ is measured in N/A and represents the actuator's efficiency. For instance, the rate of work performed by the driving force to move the magnet-carrying mass of an LRA with velocity v relative to the coil is due to the electromotive power induced in the coil:

$$vF_{Eng} = IV_{bEMF} \quad (2).$$

Based on EQs. (1) and (2), the bEMF is related to the velocity v of the mass in the following manner:

$$V_{bEMF} = k_m v \quad (3).$$

Thus, the relative velocity between the coil and magnet can be determined, based on EQ. (3), by calibrating the motor constant $k_m$ and sensing bEMF.

An equivalent electrical circuit of the LRA is shown schematically in FIG. 8. Ohm's law for this circuit at a time instance t is $$V_{drive}(t) = RI(t) + L\frac{dI(t)}{dt} + V_{bEMF}. \quad (4)$$

At a time t, $V_{drive}(t)$ is the voltage drop across the coil, L is the coil's inductance, R is the coil's resistance, and I(t) is the driving current in the coil. Since at haptic operational frequencies the inductive term is negligible, $$\frac{dI(t)}{dt} \to 0,$$

Ohm's law can be approximated as $$V_{drive}(t) = RI(t) + V_{bEMF} \quad (4').$$

Conventionally, the back EMF voltage, $V_{bEMF}$, can be extracted using EQ. (4') from the voltage drop across the two ends of the LRA's coil, $V_{drive}$, to track the state of the LRA, e.g., the instant velocity of the LRA's mass, by a controller. Thus, from EQs. (3) and (4'), the instant velocity of the mass is $$v = \frac{V_{bEMF}}{k_m} = \frac{V_{drive}(t) - RI(t)}{k_m}. \quad (5)$$

Using this approach, bEMF sensing requires good current and voltage real-time sensing capabilities, and also a-priori knowledge of the resistance of the coil under measurement.

The coil resistance knowledge is usually achieved through factory calibration. However, factory calibration is sensitive to any changes happening during product lifetime, including temperature variations. For instance, the actual value of R is typically sensitive to the thermal effects caused by large driving currents during actuation. For copper coils temperature variation can cause a resistance delta of ~0.4%/deg C., which would lead to an unusable measurement within a few deg C. variation from factory temperature.

Additionally, note that precise current sensing can be challenging to achieve, especially due to common-mode rejection. For instance, in typical conventional drivers, current sensing can be achieved with 0.1-1%/Ohm accuracy drift, depending on load impedance.

Several solutions have been conventionally implemented to mitigate errors in bEMF sensing due to the noted temperature variations of the coil resistance. One solution makes use of an external temperature sensor to track coil temperature. However, coil temperature can be very difficult to track in real-time, i.e., with low latency, due to heat transfer time constant and losses between coil and sensor. Also this solution relies on a precise knowledge of the coil temperature coefficient.

Another solution makes use of real-time impedance measurement tone. Here, a single tone signal is added on top of a haptic-intended playback, and the resistance is extracted from fft(V)/fft(I) at that frequency. A few drawbacks for this solution are enumerated below. With a conventional audio amplifier sampling rate (48-96 kHz), the measurement needs long settling time to achieve good signal-to-noise ratio (SNR). Also, the tone is likely to be in the audible range, causing an undesirable audible tone during the playback. Finally the resistance estimation tone will also increase power consumption without any force increase to the desired haptic playback.

Yet another solution makes use of a high impedance dummy coil. Here, another coil is added, and when the additional coil is driven at high impedance, i.e., with no current, it will provide a direct bEMF voltage measurement. However, the additional coil is not used for driving, and thus wastes a precious portion of the LRA's volume.

SUMMARY

In accordance with the disclosed technologies, a haptic engine includes a haptic actuator having a double-wound driving coil in which the two windings are connected in series or in parallel. By using the disclosed double-wound driving coil, an instant back EMF voltage induced in either of the two windings can be determined without having to measure in real time a resistance of the corresponding winding. By using the disclosed double-wound driving coil in which the two windings are connected in series, the instant back EMF voltage induced in either of the two windings can be determined not only without having to measure in real time the resistance of the corresponding winding, but also without having to sense a driving current through the double-wound driving coil.

In general, one innovative aspect of the subject matter described in this specification can be embodied in a haptic engine that includes a frame; a double-wound driving coil that is mechanically coupled with the frame and comprises a first coil and a second coil wound together around a common core and thermally coupled with each other, the first coil and the second coil being connected in series and having a common terminal, wherein a first ratio $$N = \frac{R_1}{R_2}$$

of the resistances or the first coil and the second coil is different from a second ratio $$M = \frac{N_1}{N_2}$$

of the numbers of turns of the first coil and the second coil; a driving source electrically coupled with the first coil at a first terminal different from the common terminal, and the second coil at a second terminal different from the common terminal to drive a driving current through the first coil and the second coil; a first voltage sensor to sense a first driving voltage across the first coil when electrically coupled with the first coil at the first terminal and the common terminal; a second voltage sensor to sense a second driving voltage across the second coil when electrically coupled with the second coil at the second terminal and the common terminal; a mass supporting one or more permanent magnets, the mass arranged to be driven relative to the frame along a driving direction when the driving current is driven through the first coil and the second coil; and computing circuitry configured to determine a velocity of the mass along the driving direction. Here, the velocity is determined (i) independently of resistances of either the first coil or the second coil, and the driving current through the first coil and the second coil, and (ii) dependently of the first driving voltage over the first coil and the second driving voltage over the second coil, and the first and second ratios.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions.

The foregoing and other embodiments can each optionally include one or more of the following features, alone or in combination. In particular, one implementation includes all the following features in combination. In some implementations, the first coil and the second coil can have the same numbers of turns and different resistances. In some cases, the first coil and the second coil have the same coil geometry and are made from wire of the same material. Here, the first coil has a first gauge, and the second coil has a second gauge different from the first gauge. In other cases, the first coil and the second coil are made from wire of the same material, and have the same gauge. Here, the first coil has a first coil geometry, and the second coil has a second coil geometry different from the first coil geometry. In yet other cases, the first coil and the second coil have the same coil geometry and the same gauge. Here, the first coil is made from a first material, and the second coil is made from a second material different from the first material.

In some implementations, to determine the velocity, the computing circuitry is configured to (i) compute a first back electromotive force (bEMF) induced in the first coil or a second bEMF induced in the second coil, where each of the first bEMF and the second bEMF is computed independently of resistances of either the first coil or the second coil, and the driving current through the first coil and the second coil, and dependently of the first driving voltage over the first coil, and the second driving voltage over the second coil, and the first and second ratios, and (ii) take a third ratio of the first bEMF to a first motor constant associated with the first coil, or a fourth ratio of the second bEMF to a second motor constant associated with the second coil.

In some implementations, the driving source is configured to drive the driving current through the first coil and the second coil with frequencies in a frequency range of 10 Hz to 1 kHz, preferably 40 Hz to 300 Hz.

In any of the above implementations, the haptic engine can include an integrated circuit. In some cases, the integrated circuit can include (i) driver circuitry comprising the driving source configured as a driving-current source to supply the driving current through the first coil and the second coil, (ii) first sensing circuitry comprising the first voltage sensor, and (iii) second sensing circuitry comprising the second voltage sensor. Here, the computing circuitry is coupled with the first sensing circuitry to receive values of the first driving voltage across the first coil sensed by the first voltage sensor, and the second sensing circuitry to receive values of the second driving voltage across the second coil sensed by the second voltage sensor. In other cases, the integrated circuit can include driver circuitry comprising the driving source configured as a driving-voltage source to supply a driving voltage across the first coil and the second coil to induce the driving current through the first coil and the second coil. For example, the driver circuitry can include the first voltage sensor to sense the driving voltage across the first coil and the second coil when electrically coupled with the first coil and the second coil at the first terminal and the second terminal, and the integrated circuit can include sensing circuitry comprising the second voltage sensor to sense the second driving voltage across the second coil when electrically coupled with the second coil at the second terminal and the common terminal. As another example, the driver circuitry can include the second voltage sensor to sense the driving voltage across the first coil and the second coil when electrically coupled with the first coil and the second coil at the first terminal and the second terminal, and the integrated circuit can include sensing circuitry comprising the first voltage sensor to sense the first driving voltage across the first coil when electrically coupled with the first coil at the first terminal and the common terminal. In any of the above cases, the integrated circuit can be disposed either inside or outside the frame.

In some of the above implementations, the computing circuitry can be disposed either inside or outside the frame.

In some implementations, a device can include a haptic interface; the haptic engine of any of the above cases coupled with the haptic interface; and a controller coupled with the computing circuitry and the driver circuitry. Here, the controller is configured to (i) receive values of the velocity of the mass computed by the computing circuitry, (ii) receive or access a target value of the velocity of the mass, and (iii) cause, based on a comparison of the computed and target values of the velocity, current adjustments of the driving current supplied by the driving-current source to the first coil and the second coil or voltage adjustments of the driving voltage supplied by the driving-voltage source across the series-connected first and second coils. The device can be any one of a smartphone, a tablet, a laptop or a watch.

In general, another innovative aspect of the subject matter described in this specification can be embodied in methods for determining back electromagnetic force (bEMF) using a coil with two windings wound together around a common core, the two windings connected in series, where a first ratio $$N = \frac{R_1}{R_2}$$

of the resistances of a first of the two windings and second of the two windings is different from a second ratio $$M = \frac{N_1}{N_2}$$

of the numbers of turns of the first winding and the second winding. The methods include driving an AC current through the two windings; sensing a first voltage across the first winding; sensing a second voltage across the second winding; and computing a first bEMF induced in the first winding or a second bEMF induced in the second winding. Here, each of the first bEMF and the second bEMF is computed (i) independently of resistances of either the first winding or the second winding, and the driving current through the two windings, and (ii) dependently of the first driving voltage over the first winding and the second driving voltage over the second winding, and the first and second ratios.

The foregoing and other embodiments can each optionally include one or more of the following features, alone or in combination. In particular, one implementation includes all the following features in combination. In some implementations, driving the AC current through the two windings comprises supplying a driving voltage across the two windings. In some implementations, driving the AC current through the two windings comprises supplying the AC current through the two windings.

In any of the above implementations, computing the first bEMF or the second bEMF is performed in accordance with EQs. (12) and (7). In any of the above implementations, the AC current through the two windings can be driven with frequencies in a frequency range of 10 Hz to 1 kHz, preferably 40 Hz to 300 Hz.

In general, yet another innovative aspect of the subject matter described in this specification can be embodied in methods for determining back electromagnetic force (bEMF) using a resistor and a coil wound around the resistor, the coil and the resistor being connected in series. The methods include driving an AC current through the resistor and the coil; sensing a first voltage across the resistor; sensing a second voltage across the coil; and computing a bEMF induced in the coil. Here, the bEMF is computed (i) independently of resistances of either the resistor or the coil, and the AC current through the resistor and the coil, and (ii) dependently of the first voltage over the resistor and the second voltage over the coil, and a ratio $$N = \frac{R_1}{R_2}$$

of the resistances of the resistor and the coil.

The foregoing and other embodiments can each optionally include one or more of the following features, alone or in combination. In particular, one implementation includes all the following features in combination. In some implementations, driving the AC current through the resistor and the coil comprises supplying a driving voltage across the resistor and the coil. In some implementations, driving the AC current through the resistor and the coil comprises supplying the AC current through the resistor and the coil.

In any of the above implementations, computing the bEMF is performed in accordance with EQ. (16). In any of the above implementations, the AC current through the resistor and the coil can be driven with frequencies in a frequency range of 40 Hz to 300 Hz.

In general, yet another innovative aspect of the subject matter described in this specification can be embodied in a haptic engine that includes a frame; a double-wound driving coil that is mechanically coupled with the frame and comprises a first coil and a second coil wound together around a common core and thermally coupled with each other, the first coil and the second coil being connected in parallel at common terminals; a driving source electrically coupled with the parallel-connected first coil and second coil to drive a driving voltage across the parallel-connected first coil and second coil; a voltage sensor electrically coupled with the parallel-connected first coil and second coil to sense the driving voltage across the parallel-connected first coil and second coil; a first current sensor electrically coupled with the first coil to sense a first driving current caused through the first coil by the driving voltage; a second current sensor electrically coupled with the second coil to sense a second driving current caused through the second coil by the driving voltage, wherein a first ratio $$M = \frac{N_1}{N_2}$$

of the numbers of turns of the first coil and the second coil is different from a product of a second ratio $$N = \frac{R_1}{R_2}$$

of the resistances of the first coil and the second coil and a third ratio $$\frac{I_1}{I_2}$$

of the sensed first and second currents; a mass supporting one or more permanent magnets, the mass arranged to be driven relative to the frame along a driving direction when the driving voltage is supplied across the parallel-coupled first coil and the second coil; and computing circuitry configured to determine a velocity of the mass along the driving direction. Here, the velocity is determined (i) independently of resistances of either the first coil or the second coil, and (ii) dependently of the values of the driving voltage, and the first, second, and third ratios.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions.

The foregoing and other embodiments can each optionally include one or more of the following features, alone or in combination. In particular, one implementation includes all the following features in combination. In some implementations, the first coil and the second coil have the same numbers of turns and different resistances. In some cases, the first coil and the second coil have the same coil geometry, and are made from wire of the same material. Here, the first coil has a first gauge, and the second coil has a second gauge different from the first gauge. In other cases, the first coil and the second coil are made from wire of the same material, and have the same gauge. Here, the first coil has a first coil geometry, and the second coil has a second coil geometry different from the first coil geometry. In yet other cases, the first coil and the second coil have the same coil geometry and the same gauge. Here, the first coil is made from a first material, and the second coil is made from a second material different from the first material.

In some implementations, to determine the velocity, the computing circuitry is configured to (i) compute a first back electromotive force (bEMF) induced in the first coil or a second bEMF induced in the second coil, where each of the first bEMF and the second bEMF is computed independently of resistances of either the first coil or the second coil, and dependently of the values of the driving voltage, and the first, second, and third ratios, and (ii) take a fourth ratio of the first bEMF to a first motor constant associated with the first coil, or a fifth ratio of the second bEMF to a second motor constant associated with the second coil. In some implementations, the driving source can be configured to drive the driving voltage across the parallel-connected first coil and second coil with frequencies in a frequency range of 10 Hz to 1 kHz, preferably 40 Hz to 300 Hz.

In any of the above implementations, the haptic engine can include an integrated circuit. In some cases, the integrated circuit can include (i) driver circuitry comprising the driving source configured as a driving-voltage source to supply the driving voltage across the parallel-connected first coil and second coil, (ii) first sensing circuitry comprising the first current sensor, and (iii) second sensing circuitry comprising the second current sensor. For example, the driver circuitry can include the voltage sensor. Here, the computing circuitry is coupled with the voltage sensor to receive values of the driving voltage across the parallel-connected first coil and second coil, the first sensing circuitry to receive values of the first driving current through the first coil sensed by the first current sensor, and the second sensing circuitry to receive values of the second driving current through the second coil sensed by the second current sensor.

In other cases, the integrated circuit can include (i) driver circuitry can include the driving source configured as a driving-current source to supply a driving current to induce the first driving current through the first coil and the second driving current through the second coil, (ii) first sensing circuitry comprising the first current sensor, and (iii) second sensing circuitry comprising the second current sensor. Here, either the first sensing circuitry or the second sensing circuitry can include the voltage sensor. In any of the above cases, the integrated circuit can be disposed either inside or outside the frame.

In some of the above implementations, the computing circuitry is disposed either inside or outside the frame.

In some implementations, a device can include a haptic interface; the haptic engine of some of the above cases coupled with the haptic interface; and a controller coupled with the computing circuitry and the driver circuitry. Here, the controller is configured to (i) receive values of the velocity of the mass computed by the computing circuitry, (ii) receive or access a target value of the velocity of the mass, and (iii) cause, based on a comparison of the computed and target values of the velocity, voltage adjustments of the driving voltage supplied by the driving-voltage source across the parallel-connected first coil and second coil. The device can be any one of a smartphone, a tablet, a laptop or a watch.

In general, yet another innovative aspect of the subject matter described in this specification can be embodied in methods for determining back electromagnetic force (bEMF) using a coil with two windings wound together around a common core, the two windings being connected in parallel. The methods include supplying an AC voltage across the two parallel-connected windings; sensing a first current through the first winding; sensing a second current through the second winding, wherein a first ratio $$M = \frac{N_1}{N_2}$$

of the numbers of turns of a first of the two windings and a second of the two windings is different from a product of a second ratio $$N = \frac{R_1}{R_2}$$

of the resistances of the first winding and the second winding to a third ratio $$\frac{I_1}{I_2}$$

of the sensed first and second currents; and computing a first bEMF induced in the first winding or a second bEMF induced in the second winding. Here, each of the first bEMF and the second bEMF is computed (i) independently of resistances of either the first winding or the second winding, and (ii) dependently of the values of the AC voltage, and the first, second, and third ratios.

The foregoing and other embodiments can each optionally include one or more of the following features, alone or in combination. In particular, one implementation includes all the following features in combination. In some implementations, computing the first bEMF or the second bEMF is performed in accordance with the EQs. (15) and (7). In any of the previous implementations, the AC voltage across the two parallel-connected windings can be supplied with frequencies in a frequency range of 10 Hz to 1 kHz, preferably 40 Hz to 300 Hz.

In general, yet another innovative aspect of the subject matter described in this specification can be embodied in methods for determining back electromagnetic force (bEMF) using a resistor and a coil wound around the resistor, the coil and the resistor being connected in parallel. The methods include supplying an AC voltage through the parallel-connected resistor and coil; sensing a first current through the resistor; sensing a second current through the coil; and computing a bEMF induced in the coil. Here, the bEMF is computed (i) independently of resistances of either the resistor or the coil, and (ii) dependently of the values of the AC voltage, a first ratio $$\frac{I_1}{I_2}$$

of the sensed first and second currents, and a second ratio $$N = \frac{R_1}{R_2}$$

of the resistances of the resistor and the coil.

The foregoing and other embodiments can each optionally include one or more of the following features, alone or in combination. In particular, one implementation includes all the following features in combination. In some implementations, computing the bEMF is performed in accordance with EQ. (17). In any of the previous implementations, the AC voltage across the parallel-connected resistor and coil can be supplied with frequencies in a frequency range of 40 Hz to 300 Hz.

The subject matter described in this specification can be implemented in particular embodiments so as to realize one or more of the following advantages. For example, by using the disclosed double-wound driving coil in which the two windings are connected either in series or in parallel, an instant back EMF voltage induced in either of the two windings is suitably determined without having to measure in real time a resistance of the corresponding winding. In view of this first technical effect, the disclosed determinations of the instant bEMF are robust against temperature variations, while reducing or eliminating accuracy requirements for factory impedance calibration.

As another example, by using the disclosed double-wound driving coil in which the two windings are connected in series, the instant back EMF voltage induced in either of the two windings is suitably determined not only without having to measure in real time the resistance of the corresponding winding, but also without having to sense a driving current through the double-wound driving coil. In view of this second technical effect, the disclosed determinations of the instant bEMF are less sensitive to common-mode rejection, and thus load, relative to their conventional counterparts. Also, since in accordance with the latter aspects of the disclosed technologies, there is no need for real-time current measurements, current sensing circuitry could be scaled down or eliminated. This will enable design of simpler sensing circuitry, which may include mostly, or only, voltage sensing circuitry. The latter can be integrated as smaller-footprint, and less power-hungry, IC chips.

Further, since in accordance with the disclosed technologies, there is no need for (i) real-time impedance measurements, and in some cases (ii) real-time current measurements, a settling time associated with their conventional counterparts is eliminated. Furthermore, the need to add an extra tone to playback is avoided by using the disclosed technologies, which leads to eliminating additional acoustic noise and power consumption associated with such a conventional approach of adding an extra tone to playback. Additionally, no volume of the haptic actuator is wasted by a dummy coil, since both windings of the disclosed double-wound driving coil are used for driving. Thus, the haptic actuator's mass can be driven more effectively when both windings contribute to driving the mass compared to the conventional case in which only one of two coils is used for driving, since one the dummy coil is used only for sensing.

In some implementations, a driver IC in accordance with the disclosed technologies includes a single driving channel for driving either the series-connected or the parallel-connected coils of the double-wound driving coil, along with a sensing channel associated with a first coil of the double-wound driving coil, and a replicated sensing channel associated with a second coil of the double-wound driving coil. The single driving channel includes a driver circuit, and each of the sensing channels includes a voltage/current sensing circuit. Conventionally, two driver ICs would be used, each with its own driving circuit and voltage/current sensing circuit. This ensures that the disclosed technologies can use smaller footprint within the haptic actuator for driving/sensing circuitry.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is an example mobile device architecture that uses a haptic engine including the disclosed haptic actuator, according to an embodiment.

Like reference numbers and designations in the various drawings indicate like elements.

DETAILED DESCRIPTION

Figure 1A:
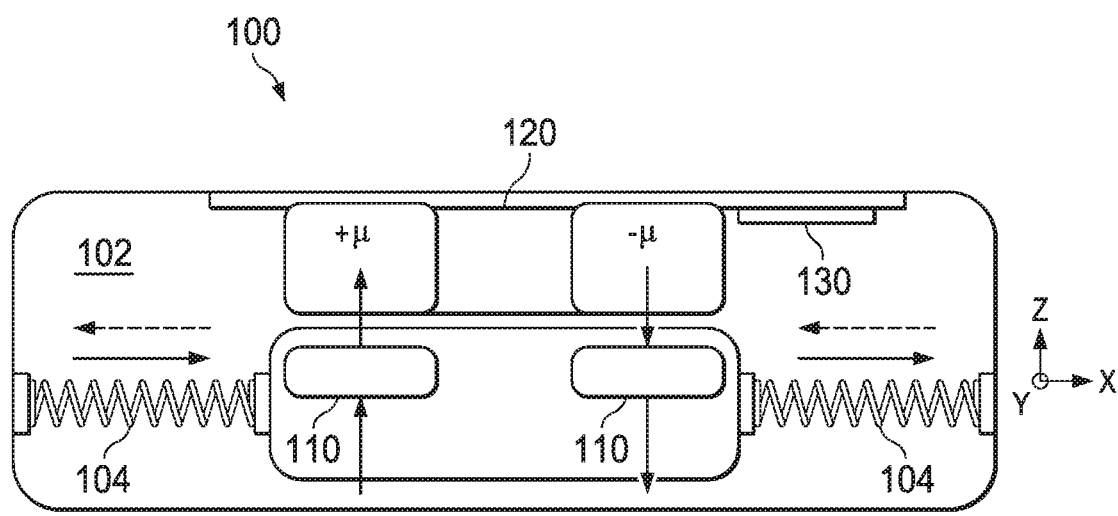
FIG. 1A shows an example of a haptic actuator having a double-wound driving coil in which the two windings are connected either in series or in parallel.

FIG. 1A is a cross-section view, e.g., in the (x,z)-plane, of an example of a haptic actuator 100 that includes a double-wound driving coil 120 in which the two windings 122, 124 are connected either in series or in parallel. In the example illustrated in FIG. 1A, the haptic actuator 100 is implemented as a LRA, so the term LRA will be used interchangeably for the term haptic actuator. The technologies described herein also can be applied when the haptic actuator 100 is implemented as a rotary actuator.

The haptic actuator 100 also includes a permanent magnet 110, such that the double-wound driving coil 120 and the magnet 110 are movable relative to each other. The haptic actuator 100 has a frame 102 that encapsulates a mass 105 arranged and configured to move relative the frame 102, at least, along the x-axis (e.g., through vibration left-and-right on page). Here, the double-wound driving coil 120 is mechanically coupled with (i.e., affixed to) the frame 102, and the mass 105 is configured as a cage with enclosures that hold portions of the magnet 110.

Figure 1B:
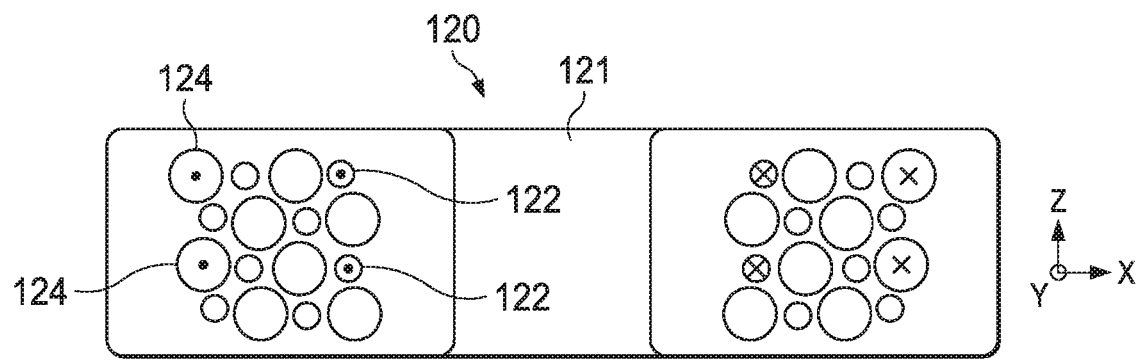
FIG. 1B is a cross-section view of a double-wound driving coil in which the two windings are connected either in series or in parallel, and where the two windings are configured in accordance with a first embodiment.
Figure 1C:
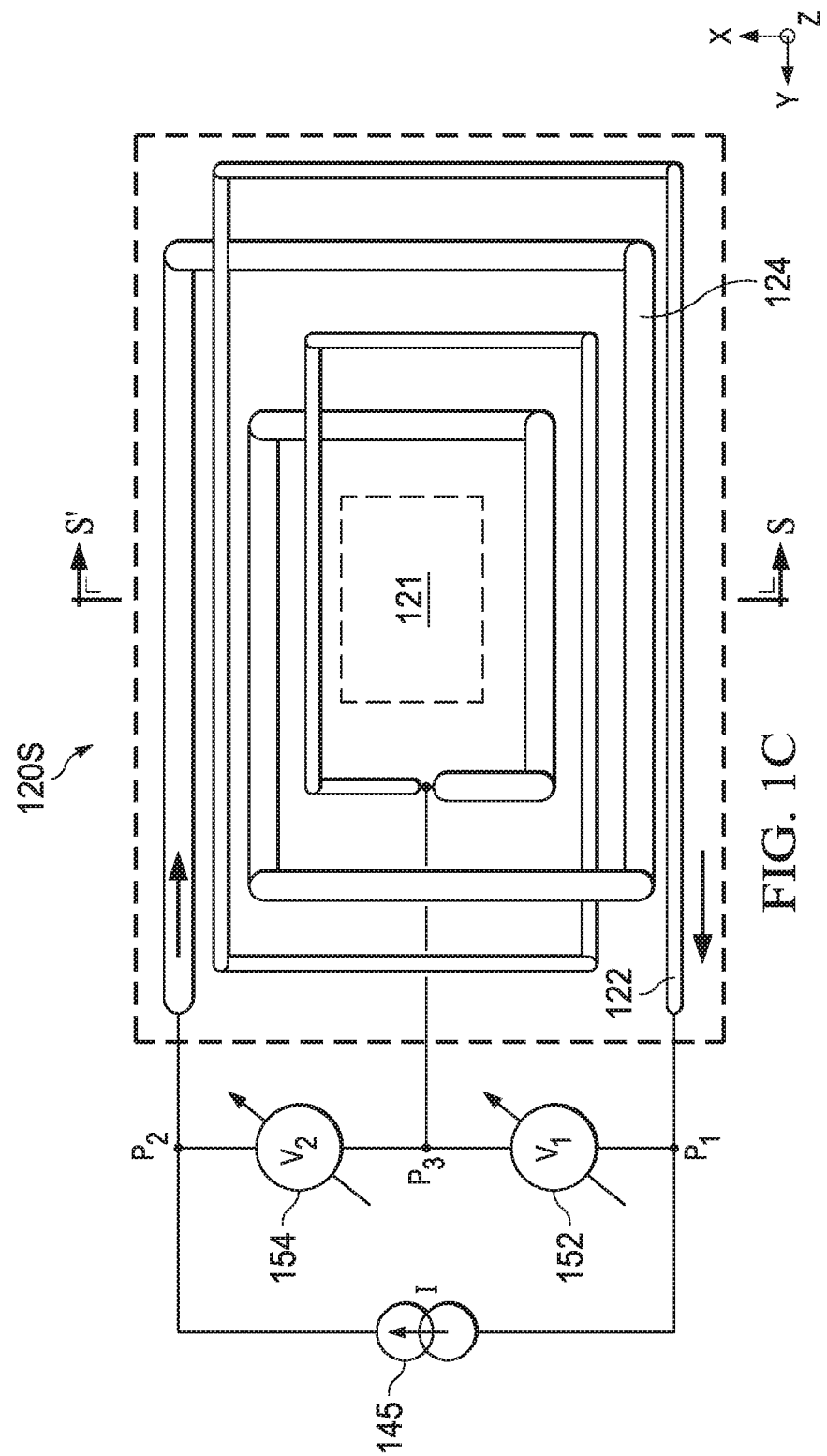
FIG. 1C shows a double-wound driving coil in which the two windings are connected in series, and are configured in accordance with the first embodiment, where the double-wound driving coil is connected with a driving source and voltage sensors.
Figure 1D:
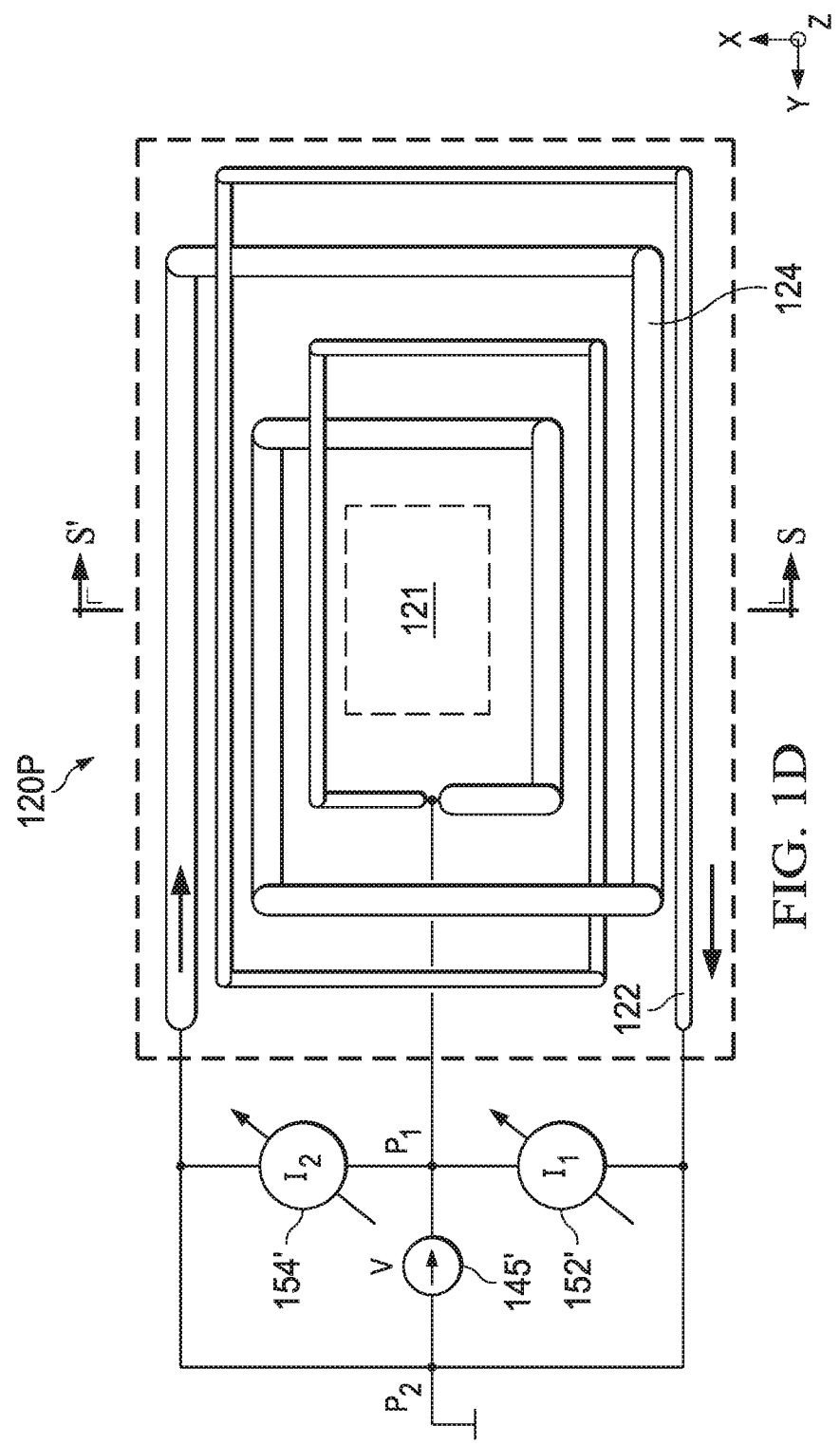
FIG. 1D shows a double-wound driving coil in which the two windings are connected in parallel, and are configured in accordance with the first embodiment, where the double-wound driving coil is connected with a driving source and current sensors.

FIG. 1B shows a close-up cross-section view of the double-wound driving coil 120 in the (x,z)-plane. Each of FIG. 1C and FIG. 1D shows a plan-view of the double-wound driving coil 120, e.g., in the (x,y)-plane. The double-wound driving coil 120 includes a first winding 122 (also referred to as the first coil) and a second winding 124 (also referred to as the second coil) electrically coupled to each other. In the implementation 120S of the double-wound driving coil shown in FIG. 1C, the first coil 122 and the second coil 124 are electrically coupled to each other in series. For the implementation 120S of the double-wound driving coil, the first coil 122 has first terminals $P_1$, $P_3$, and the second coil 124 has second terminals $P_3$, $P_2$, where the common terminal is $P_3$. In the implementation 120P of the double-wound driving coil shown in FIG. 1D, the first coil 122 and the second coil 124 are electrically coupled to each other in parallel. For the implementation 120P of the double-wound driving coil, the first coil 122 has first terminals $P_1$, $P_2$, and the second coil 124 has second terminals $P_1$, $P_2$, where $P_1$ is a common terminal, and so is $P_2$. As shown in FIGS. 1B, 1C, and 1D, the first coil 122 and the second coil 124 are wound together around a common core 121.

Since the haptic actuator 100 is, in the example shown in FIG. 1A, implemented as an LRA, a motor constant $k_m$ is directly proportional to a coil's number of turns, such that when the first coil 122 has a first number of turns $N_1$, and the second coil 124 has a second number of turns $N_2$, a ratio M of a first motor constant $k_{m_1}$, or first efficiency, associated with the first coil 122 to a second motor constant $k_{m_2}$, or second efficiency, associated with the second coil 124 is given by $$M = \frac{N_1}{N_2} = \frac{k_{m_1}}{k_{m_2}}. \tag{6}$$

For example, if the first coil 122 has a first number of turns $N_1$, and the second coil 124 has a second number $N_2$ of turns that is smaller, then the ratio M of their efficiencies satisfies M>1. As another example, if the first coil 122 has the same number of turns as the second coil 124, then the ratio M of their efficiencies satisfies M=1. In view of EQ. (6), values of back EMF voltages induced in the first and second coils 122, 124, respectively, obey the same ratio as the ratio of the coil efficiencies:

$$M = \frac{V_{bEMF_1}}{V_{bEMF_2}}. \tag{7}$$

Moreover, in the embodiment of the double-wound driving coil 120 illustrated in FIGS. 1B-1D, the first coil 122 has a cross-section that is smaller than the cross-section of the second coil 124. Thus, in some examples, when the first and second coils 122, 124 have the same number of turns, corresponding to M=1, the first coil 122 has a first resistance $R_1$ that is larger than a second resistance $R_2$ of the second coil 124. This can be expressed as $$R_1 = NR_2 \tag{8},$$

where N is a ratio of the resistances of the first and second coils 122, 124.

Since the first coil 122 and the second coil 124 are tightly wound together, as shown in FIG. 1B, they are thermally, as well as magnetically, matched with each other. Thus, the thermal matching of the first coil 122 and the second coil 124, in either of the implementations 120S or 120P of the double-wound driving coil, ensures that they will be at substantially the same temperature whether or not driving currents are provided there through. The magnetic matching ensures that the magnetic field flux per turn will be the same for both coils. In this way the ratio between the motor constant of the two coils will be consistent during the whole operation of the haptic actuator, independently from the magnet position relative to the coils. Additionally, since the first coil 122 and the second coil 124 are connected in series in the implementation 120S of the double-wound driving coil, the sensing of the back EMF voltages induced therein can be performed without having to determine the current through the coils, thus minimizing the back EMF voltage's sensitivity to common-mode rejection, and thus load.

Referring to FIG. 1C, the back EMF voltage sensed using the disclosed technologies can in turn be used to determine the instant velocity of the LRA 100's mass 105, in accordance with EQ. (3), independently of temperature and load, when the first and second coils 122, 124 are connected in series in the implementation 120S of the double-wound driving coil. Instead, the sensing of the back EMF voltages induced in the series-connected first coil 122 and the second coil 124 relies, as shown below, on (i) knowledge of the ratio $N=R_1/R_2$ of the resistances of the first and second coils 122, 124, and the ratio $M=k_{m_1}/k_{m_2}$ of the engine efficiencies associated with the first and second coils 122, 124; and (ii) measurements of first driving voltage $V_1$ across the first coil 122, and a second driving voltage $V_2$ across the second coil 124. Note that knowledge of the ratios N and M is suitably achieved as an initial-time $t_0$ calibration, e.g., achieved through factory calibration; and the voltage measurements are suitably performed as described below.

Driving and sensing circuitry for actuating the haptic actuator 100 can be integrated in a driver integrated circuit (IC) 130. In the example shown in FIG. 1A, the driver IC 130 is disposed inside the frame 102. However, the driver IC can also be disposed inside the frame 102. In the example shown in FIG. 1C, driving and sensing circuitry includes a driving-current source 145, a first voltage sensor 152, and a second voltage sensor 154. Here, the driving-current source 142 is electrically coupled at terminal $P_1$ from among the first terminals of the first coil 122, and at terminal $P_2$ from among the second terminals of the second coil 124 and provides a common current I through the two series-connected coils 122, 124. Note that the current I is the driving current of the haptic actuator 100. The first voltage sensor 152 is electrically coupled with the first coil 122 at the first terminals $P_1$, $P_3$ to sense the first driving voltage $V_1$ across the first coil 122. The second voltage sensor 154 is electrically coupled with the second coil 124 at the second terminals $P_3$, $P_1$ to sense the second driving voltage $V_2$ across the second coil 124. Note that since the haptic actuator 100 is, in the example shown in FIG. 1A, implemented as an LRA, each of the first and second driving voltages $V_1$, $V_2$ includes terms like the ones of EQ. (4').

Figure 2A:
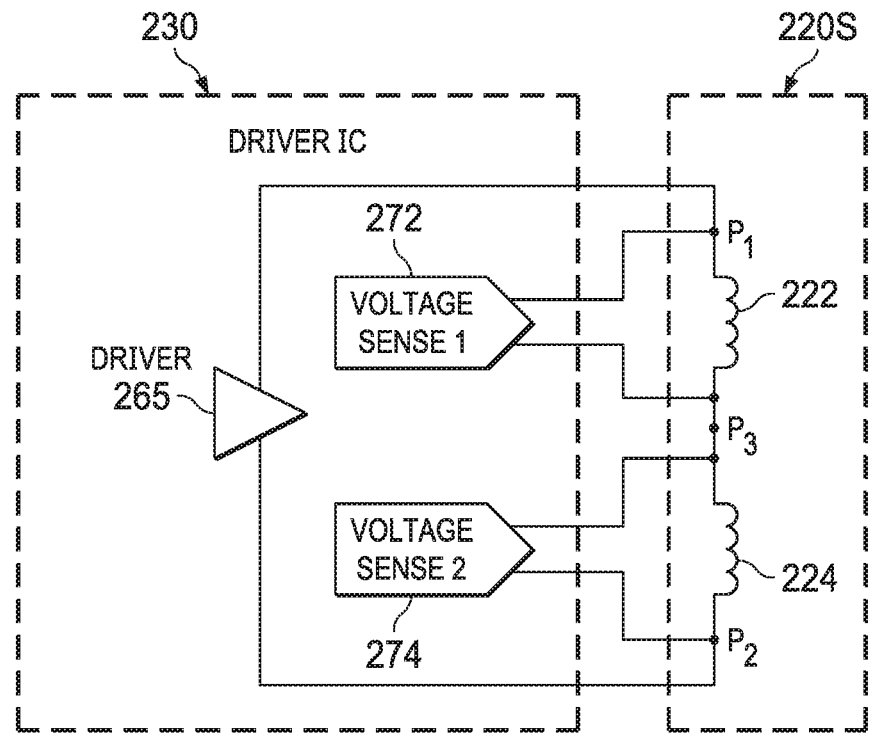
FIG. 2A is a schematic electrical diagram of an example of driving circuitry coupled with a haptic actuator having a double-wound driving coil in which the two windings are connected in series.

FIG. 2A is schematic electrical diagram of driver circuitry coupled with a haptic actuator's double-wound driving coil 220S in which the two coils 222, 224 are connected in series and wound together in a manner similar to the implementation 120S of the double-wound driving coil, in one embodiment. In another embodiment, the double-wound driving coil 220S can be implemented like a double-wound driving coil described below in connection with FIG. 3A. In yet another embodiment, the double-wound driving coil 220S can be implemented like a double-wound driving coil described below in connection with FIG. 4.

In the example illustrated in FIG. 2A, a driver chip 230 is an IC that includes driver circuitry 265 coupled with the double-wound driving coil 220S at the first terminal $P_1$ and the second terminal $P_2$, first voltage sensing circuitry 272 coupled with the first coil 222 at the first terminals $P_1$, $P_3$, and second voltage sensing circuitry 274 coupled with the second coil 222 at the second terminals $P_3$, $P_2$. In some implementations, the driver circuitry 265 includes a driving-current source (e.g., 145) to supply a driving current I through the double-wound driving coil 220S. In other implementations, the driver circuitry 265 includes a driving-voltage source to supply a driving voltage V across the double-wound driving coil 220S, which causes the driving current I through the double-wound driving coil 220S.

The first voltage sensing circuitry 272 includes a first voltage sensor (e.g., 152) to sense a first driving voltage $V_1$ across the first coil 222. In accordance with EQ. (4'), the first driving voltage $V_1$ has the following terms:

$$V_1 = R_1 I + V_{bEMF_1} \qquad (9a).$$

The contribution of the first term of EQ. (9a) is due to the first resistance $R_1$ of the first coil 222, and the contribution of the second term is due to the first bEMF induced in the first coil 122.

The second voltage sensing circuitry 274 includes a second voltage sensor (e.g., 154) to sense a second driving voltage $V_2$ across the second coil 224. In accordance with EQ. (4'), the second driving voltage $V_2$ has the following terms:

$$V_2 = R_2 I + V_{bEMF_2} \qquad (9b).$$

The contribution of the first term of EQ. (9b) is due to the second resistance $R_2$ of the second coil 224, and the contribution of the second term is due to the second bEMF induced in the second coil 224.

In another example, not shown in FIG. 2A, either one of the first voltage sensing circuitry 272 or the second voltage sensing circuitry 274 can be arranged and configured to sense driving voltage V across the double-wound driving coil 220S. This can be accomplished, in a first case, when the first voltage sensing circuitry 272 is disconnected from the first terminals $P_1$, $P_3$ of the first coil 222, then reconnected to the first terminal $P_1$ and the second terminal $P_2$ of the double-wound driving coil 220S, while the second voltage sensing circuitry 274 stays connected as shown in FIG. 2A. Here, the value $V_1$ of the first driving voltage across the first coil 222, to be used in EQ. (9a), will be measured as the difference between the driving voltage V across the double-wound driving coil 220S sensed by the reconnected first voltage sensing circuitry 272, and the second driving voltage $V_2$ across the second coil 224 sensed by the second voltage sensing circuitry 274. Alternatively, in a second case, the second voltage sensing circuitry 274 is disconnected from the second terminals $P_2$, $P_3$ of the second coil 224, then reconnected to the first terminal $P_1$ and the second terminal $P_2$ of the double-wound driving coil 220S, while the first voltage sensing circuitry 272 stays connected as shown in FIG. 2. Here, the value $V_2$ of the second driving voltage across the second coil 224, to be used in EQ. (9b), will be measured as the difference between the driving voltage V across the double-wound driving coil 220S sensed by the reconnected second voltage sensing circuitry 274, and the first driving voltage $V_1$ across the first coil 222 sensed by the first voltage sensing circuitry 272.

Referring now to FIG. 1D, the back EMF voltage sensed using the disclosed technologies can in turn be used to determine the instant velocity of the LRA 100's mass 105, in accordance with EQ. (3), independently of temperature, when the first and second coils 122, 124 are connected in parallel in the implementation 120P of the double-wound driving coil. Instead, the sensing of the back EMF voltages induced in the parallel-connected first coil 122 and the second coil 124 relies, as shown below, on (i) knowledge of the ratio N of the resistances of the first and second coils 122, 124, and the ratio M of the engine efficiencies associated with the first and second coils 122, 124; and (ii) measurements of a common driving voltage V across each of the first and second coils 122, 124, and a ratio $I_1/I_2$ of respective driving currents through the first and second coils 122, 124. Note that while the knowledge of the ratios N and M is suitably achieved as an initial-time $t_0$ calibration, as noted above; and the voltage and current ratio measurements are suitably performed as described below.

In the example shown in FIG. 1D, driving and sensing circuitry includes a driving-voltage source 145', a first current sensor 152', and a second current sensor 154'. Here, the driving-voltage source 142' is electrically coupled at terminal $P_1$, which is common to the first and second coils 122, 124, and at terminal $P_2$, which also is common to the first and second coils 122, 124, and provides a common voltage V across each of the two parallel-connected coils 122, 124. Note that the voltage V is the driving voltage of the haptic actuator 100. The first current sensor 152' is electrically coupled with the first coil 122 to sense a first driving current $I_1$ through the first coil 122 caused by the voltage V across the first coil 122. The second current sensor 154' is electrically coupled with the second coil 124 to sense a second driving current $I_2$ through the second coil 124 caused by the voltage V across the second coil 124. Note that since the haptic actuator 100 is, in the example shown in FIG. 1A, implemented as an LRA, the voltage V across either of the first coil 122 or the second coil 124 of the implementation 120P of the double-wound driving coil includes a term depending on respective driving current $I_1$ or driving current $I_2$ like the one of EQ. (4').

Figure 2B:
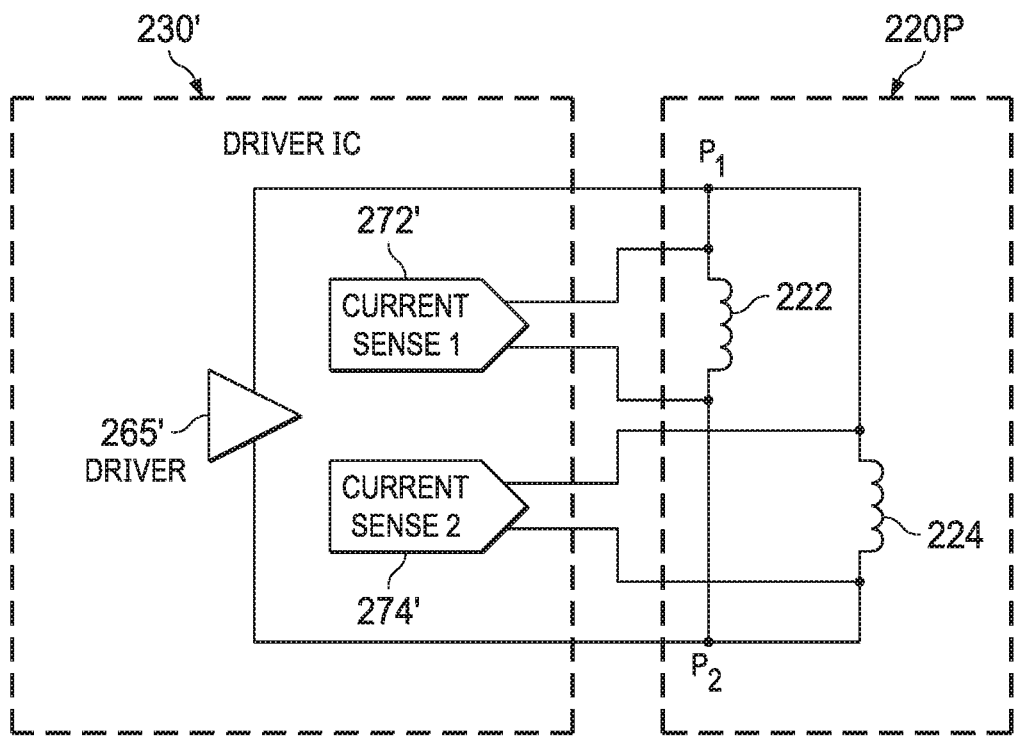
FIG. 2B is a schematic electrical diagram of another example of driving circuitry coupled with a haptic actuator having a double-wound driving coil in which the two windings are connected in parallel.

FIG. 2B is schematic electrical diagram of driver circuitry coupled with a haptic actuator's double-wound driving coil 220P in which the two coils 222, 224 are connected in parallel and wound together in a manner similar to the implementation 120P of the double-wound driving coil, in one embodiment. In another embodiment, the double-wound driving coil 220P can be implemented like a double-wound driving coil described below in connection with FIG. 3B. In yet another embodiment, the double-wound driving coil 220P can be implemented like a double-wound driving coil described below in connection with FIG. 4.

In the example illustrated in FIG. 2B, a driver chip 230' is an IC that includes driver circuitry 265' coupled with the double-wound driving coil 220P at the first terminal $P_1$ and the second terminal $P_2$, first current sensing circuitry 272' coupled with the first coil 222, and second current sensing circuitry 274' coupled with the second coil 222.

In some implementations, the driver circuitry 265' includes a driving-voltage source (e.g., 145') to supply a driving voltage V across each of the two parallel-connected coils 222, 224 of the double-wound driving coil 220P. Here, the driver circuitry 265' can include a voltage sensor arranged and configured to sense values of the driving voltage V across the double-wound driving coil 220P.

The first current sensing circuitry 272' includes a first current sensor (e.g., 152') to sense a first driving current $I_1$ through the first coil 222 caused by the driving voltage V across the first coil 222. In accordance with EQ. (4'), the driving voltage V has the following terms:

$$V = R_1 I_1 + V_{bEMF_1} \quad (10a).$$

The contribution of the first term of EQ. (10a) is due to the first resistance $R_1$ of the first coil 222, and the contribution of the second term is due to the first bEMF induced in the first coil 122.

The second current sensing circuitry 274' includes a second current sensor (e.g., 154') to sense a second driving current $I_2$ through the second coil 224 caused by the driving voltage V across the second coil 224. In accordance with EQ. (4'), the driving voltage V has the following terms:

$$V = R_2 I_2 + V_{bEMF_2} \quad (10b).$$

The contribution of the first term of EQ. (10b) is due to the second resistance $R_2$ of the second coil 224, and the contribution of the second term is due to the second bEMF induced in the second coil 224.

In other implementations, the first current sensing circuitry 272' can also include a first voltage sensor arranged and configured to sense values of the driving voltage V across the first coil 122, and the second current sensing circuitry 274' can also include a second voltage sensor arranged and configured to sense values of the driving voltage V across the second coil 124. In these other implementations, the driver circuitry 265' can include a driving-current source, instead of the above-noted driving-voltage source. Here, driving-current source could supply a driving current to the double-wound driving coil 220P, which would split into the first driving current $I_1$ through the first coil 122, and the second driving current $I_2$ through the second coil 124.

Referring again to FIG. 1A and either FIG. 1C or FIG. 1D, the mass 105 of the LRA 100 is arranged to be driven relative to the frame 102 along the driving direction when the driving current I is being supplied through the implementation 120S of the double-wound driving coil, or the first driving current $I_1$ is being driven through the first coil 122, and the second driving current $I_2$ is being driven through the second coil 124, of the implementation 120P of the double-wound driving coil. Here, a left portion of the magnet 110 is oriented with its north pole towards the top of the page and its south pole towards the bottom of the page, and a right portion of the magnet 110 is oriented with its north pole towards the bottom of the page and its south pole towards the top of the page. As shown in FIG. 1B, left sections of the first coil 122 and the second coil 124 have flow of the driving current I, or the first driving current $I_1$ and the second driving current $I_2$ along the negative y-axis (here, out of the page), while right sections of the first coil 122 and the second coil 124 have the opposite flow of the driving current I, or the first driving current $I_1$ and the second driving current $I_2$, along the positive y-axis (here, into the page). As such, either of the implementation 120S or 120P of the double-wound driving coil experiences a Lorentz force to the left of the page, and the magnet 110, along with the mass 105, will move towards the right of the page. In this manner, an alternating (i.e., driving) current I, which is provided through the implementation 120S of the double-wound driving coil, causes, or alternating (i.e., driving) currents $I_1$ and $I_2$, which are provided through the first coil 122 and the second coil 124, respectively, of the implementation 120P of the double-wound driving coil, cause, a periodic Lorentz force that drives, along the x-axis, the mass 105 including the magnet 120. Springs 104 are used to couple the mass 105 to the frame 102, and are arranged and configured to return the mass 105 at its equilibrium position by opposing the noted periodic Lorentz force. Only two lines of a spatial distribution of a magnetic field emitted by the combination of double-wound driving coil 120 and magnet 110 is shown in FIG. 1A.

A frequency of the driving current I through the implementation 120S of the double-wound driving coil, or the first driving current $I_1$ through the first coil 122, and the second driving current $I_2$ through the second coil 124, of the implementation 120P of the double-wound driving coil, is in a frequency range of 10 Hz to 1 kHz, e.g., 30 Hz to 300 Hz. An amplitude and frequency of the velocity v of the mass 105 is proportional to an amplitude and frequency of the driving current I provided through the double-wound driving coil 120S, or amplitudes and frequency of the first driving current $I_1$ through the first coil 122, and the second driving current $I_2$ through the second coil 124, of the implementation 120P of the double-wound driving coil, as explained below.

Moreover, referring to FIG. 1D, the first coil 122 and the second coil 124 of the implementation 120P of the double-wound driving coil are wound together in opposite directions, e.g., one in clock-wise directions and the other one in counter-clock-wise direction. In this manner, the driving currents $I_1$ and $I_2$ are provided 180° out-of-phase through the first coil 122 and the second coil 124, respectively, to ensure that the Lorentz forces, caused by the respective driving currents $I_1$ and $I_2$, enforce each other.

Referring now to FIG. 2A, as well as in accordance with EQs. (7), (8), (9a) and (9b), $$MV_{bEMF_2} = V_1 - NR_2 I \quad (11a),$$

$$V_{bEMF_2} = V_2 - R_2 I \quad (11b).$$

A bEMF-computing module, e.g., computing circuitry such as a digital signal processor (DSP), can be coupled with the first voltage sensing circuitry 272 to receive values of the first driving voltage $V_1$ across the first coil 222, and with the second voltage sensing circuitry 274 to receive values of the second driving voltage $V_2$ across the second coil 224 of the double-wound driving coil 220S. Such a bEMF-computing module is configured to solve the system of EQs. (11a), (11b) to determine the value of the back EMF voltage induced in the second coil 224 of the double-wound driving coil 220S as $$V_{bEMF_2} = \frac{NV_2 - V_1}{N - M}, \quad (12)$$

where N≠M. The noted bEMF-computing module is configured to determine a value the velocity v of the mass 105 of the LRA 100 by substituting in EQ. (3) the values of the motor constant $k_{m_2}$ associated with the second coil 224 and the value of the bEMF induced in the second coil 224 determined based on EQ. (12) in the following manner:

$$v = \frac{V_{bEMF_2}}{k_{m_2}}. \quad (13)$$

Note that the double-wound driving coil 220S including the series-connected and wound-together first and second coils 222, 224 is configured to have a ratio M of the coils' efficiencies (given by EQ. (7)) different from a ratio N of the coils' resistances (given by EQ. (9)), N≠M, to ensure that the denominator of EQ. (11) is different from zero. In this manner, real-time bEMF sensing is achieved independent of the value of the current I supplied through the first coil 222 and the second coil 224, and thus it will be insensitive to load. Because there is no need for real-time current measurements, the driver IC 230 can include only voltage sensing circuitry which is simpler than current sensing circuitry. Additionally, real-time bEMF sensing is achieved independent of the resistance $R_1$ of the first coil 222 and the resistance $R_2$ of the second coil 224, and thus it will be insensitive to temperature variations.

Referring now to FIG. 2B, as well as in accordance with EQs. (7), (8), (10a) and (10b), $$MV_{bEMF_2} = V - NR_2 I_1 \quad (14a),$$

$$V_{bEMF_2} = V - R_2 I_2 \quad (14b).$$

Here, the noted bEMF-computing module can be coupled with (i) the voltage sensor of the driver circuitry 265' to receive values of the driving voltage V across the double-wound driving coil 220P, (iii) the first current sensing circuitry 272' to receive values of the first driving current $I_1$ through the first coil 222, and (iii) with the second current sensing circuitry 274' to receive values of the second driving current $I_2$ through the second coil 224. The bEMF-computing module is configured to solve the system of EQs. (14a), (14b) to determine the value of the back EMF voltage induced in the second coil 224 of the double-wound driving coil 220P as $$V_{bEMF_2} = V \frac{1 - N \frac{I_1}{I_2}}{M - N \frac{I_1}{I_2}}, \quad (15)$$

where $$M \neq N \frac{I_1}{I_2}.$$

The noted bEMF-computing module is configured to determine a value the velocity v of the mass 105 of the LRA 100 by substituting in EQ. (13) the value of the bEMF induced in the second coil 224 determined based on EQ. (15). Note that the double-wound driving coil 220P including the parallel-connected and wound-together first and second coils 222, 224 is configured to have a ratio M of the coils' efficiencies (given by EQ. (7)) different from a product of the ratio N of the coils' resistances (given by EQ. (9)) and a ratio of the measured driving currents, $$M \neq N \frac{I_1}{I_2},$$

to ensure that the denominator of EQ. (15) is different from zero. In this manner, real-time bEMF sensing is achieved independent of the resistance $R_1$ of the first coil 222 and the resistance $R_2$ of the second coil 224, and thus it will be insensitive to temperature variations.

Note that the techniques for determining the back EMF voltage induced in the windings 122, 124 of the double-wound driving coil 120, and the velocity of the mass 105, of the LRA 100 can be implemented in a similar manner in a LRA that includes a multi-stage driving system. An LRA of this type includes an array of two or more driving coils. At least one of the driving coils of the array has two windings arranged and configured as the double-wound driving coil 120 (implemented as either 120S or 120P), while each of the remaining one or more driving coils of the array has one winding arranged and configured as a single-wound driving coil. The noted array of two or more driving coils is disposed on, and mechanically coupled with (i.e., affixed to), the frame of this type of LRA. For instance, the array of two or more driving coils can be disposed on a surface of the LRA frame parallel to the (x,y)-plane, such that their magnetic axes are normal to the (x,y)-plane and distributed along the driving direction, e.g., along the x-axis. Here, the Lorentz forces caused by currents driven in the at least one double-wound driving coil 120 and the respective one or more single-wound driving coils enforce each other to cause a stronger, and/or more controllable, vibration of the LRA's mass. The at least one double-wound driving coil 120 of the array is accompanied by corresponding circuitry 265/265', 272/272' and 274/274', and each of the one or more single-wound driving coils is accompanied by corresponding driving/sensing circuitry. Based on the equations discussed above—here corresponding to the at least one double-wound driving coil 120 of the array—a value of the velocity of the LRA's mass will be determined.

Referring again to intermediate steps of the techniques described above for determining the velocity of the LRA's mass, a key requirement for determining the bEMF induced in one of two series-connected and wound-together coils 222, 224 of a double-wound driving coil 220, in accordance with EQ. (12), is that a ratio N of resistances of the coils is different from a ratio M of efficiencies associated with the coils. That is so to ensure that the denominator of EQ. (12) is not zero. The foregoing condition N≠M cannot be accomplished by simply increasing the number of turns $N_1$ of a first coil 222 by a factor of N relative to the number of turns $N_2$ of a second coil 224, because in such a case, the efficiency of the first coil 222 increases relative to the efficiency of the second coil 224 by a factor M that is equal to N. As such, the requirement that N≠M would not be satisfied using this approach. Instead, one of the configurations described below can be used to ensure that a ratio N of resistances of the coils is different from a ratio M of efficiencies associated with the coils.

Referring now to the embodiment of a double-wound driving coil 120 like the one illustrated in FIGS. 1B-1D, the first coil 122 and the second coil 124 are made from wire of the same material, have the same coil geometry, and the same number of turns, but different gauge. As noted above, the first coil 122 and the second coil 124 are wound together to efficiently track each other's temperature. Since a first cross-section of the first coil 122 is smaller than a second cross-section of the second coil 124, the first resistance $R_1$ of the first coil 122 is larger than the second resistance $R_2$ of the second coil 124, $R_1 > R_2$. Thus, N>1. The motor constant $k_{m_B}$ depends on the number of turns and is independent of the wire gauge. Also, since the first coil 122 and the second coil 124 have the same number of turns, they have the same efficiency value, and thus M=1. Therefore, because N≠M, EQ. (12) can be used to determine the bEMF induced in the second coil 124 for this embodiment of the double-wound driving coil 120.

Figure 3A:
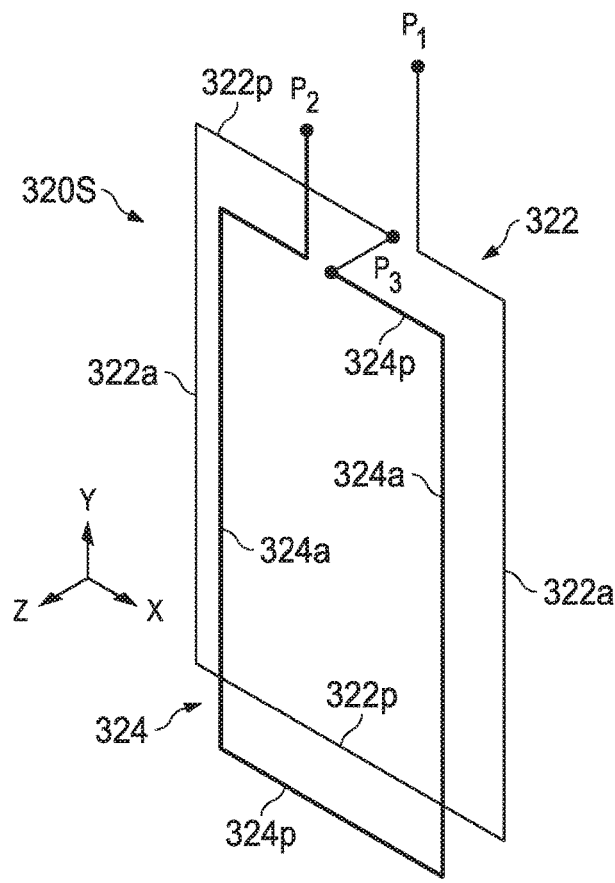
FIG. 3A is a perspective view of a double-wound driving coil in which the two windings are connected in series and are configured in accordance with a second embodiment.
Figure 3B:
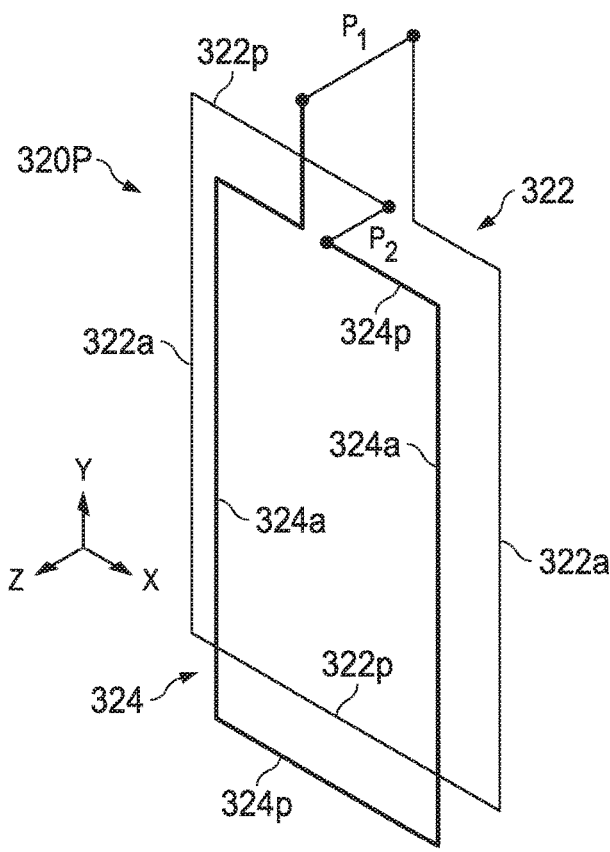
FIG. 3B is a perspective view of a double-wound driving coil in which the two windings are connected in parallel and are configured in accordance with a second embodiment.

FIGS. 3A-3B show aspects of another embodiment of a double-wound driving coil for which a ratio N of resistances of the coils 322, 324 is different from a ratio M of efficiencies associated with the coils 322, 324. The first coil 322 and the second coil 324 are made of wire of the same material, have the same gauge, and the same number of turns, but different coil geometry. The tightly-wound first coil 322 and second coil 324 are connected in series in the implementation 320S of the double-wound driving coil illustrated in FIG. 3A. Here, the first coil 322 has first terminals $P_1$, $P_3$, and the second coil 324 has second terminals $P_3$, $P_2$. The implementation 320S of the double-wound driving coil can be used to implement the double-wound driving coil 220S described above in connection with FIG. 2A. The tightly-wound first coil 322 and second coil 324 are connected in parallel in the implementation 320P of the double-wound driving coil illustrated in FIG. 3B. Here, the first coil 322 has terminals $P_1$, $P_2$, which are common with the terminals of the second coil 324. The implementation 320P of the double-wound driving coil can be used to implement the double-wound driving coil 220P described above in connection with FIG. 2B.

Note that in LRAs, a coil force is only a function of the one dimension of the coil 322/324 corresponding to active driving sides 322a/324a, while the resistance is proportional to the whole length of the coil 322/324, which also includes passive load sides 322p/324p, in addition to the active driving sides 322d/324d. The passive load sides 322p/324p are not used for actual motor driving. Note that in the example shown in FIGS. 3A-3B, the first coil 322 and the second coil 324 have equal-length active driving sides 322a/324a, while the first coil 322 has longer passive load sides 322p than the passive load sides 324p of the second coil 324. In this manner, the first coil 322 causes more power losses than the second coil 324 while having the same force efficiency as the second coil 324. For this reason, for either of the implementations 320S or 320P of the double-wound driving coil, $R_1 > R_2$, and thus N>1. However, M=1 for either of the implementations 320S or 320P of the double-wound driving coil.

Figure 4:
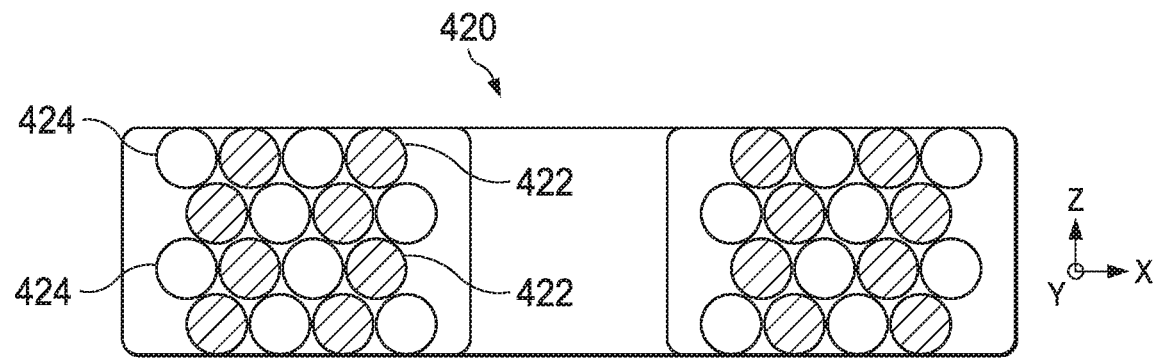
FIG. 4 is a cross-section view of a double-wound driving coil in which the two windings are connected either in series or in parallel, and where the two windings are configured in accordance with a third embodiment.

FIG. 4 shows another embodiment of a double-wound driving coil 420 for which a ratio N of resistances of the coils 422, 424 is different from a ratio M of efficiencies associated with the coils 422, 424. The double-wound driving coil 420 is formed from either series-connected or parallel-connected first coil 422 and second coil 424 which have the same gauge, the same coil geometry, and the same number of turns, but are made from different materials. The double-wound driving coil 420 can be used to implement the double-wound driving coil 220S described above in connection with FIG. 2A or the double-wound driving coil 220P described above in connection with FIG. 2B.

Here, the first coil 422 is made from Al, and second coil 424 is made from Cu, so $R_1 > R_2$, and thus N>1. However, M=1. Although, Al has higher resistivity than Cu, Al has almost the same temperature coefficient as Cu, so the first and second coils 422, 424 can be wound close together to track each other's temperature. In general, if the coils 422, 424 were placed far away from each other (e.g., were not wound together) the temperature coefficients of the coils 422, 424 can be chosen to match the power difference to have similar temperature variations. Note that the first coil 422 made from Al causes more power losses than the second coil 424 made from Cu, while having the same force efficiency as the second coil 424.

Figure 5A:
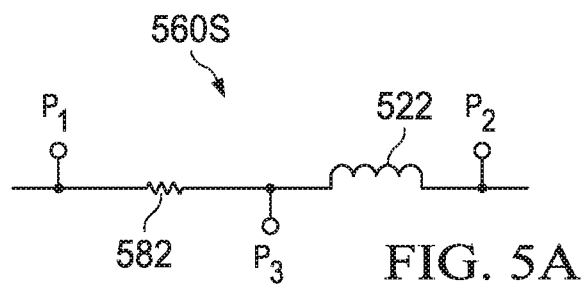
FIG. 5A shows a driving circuit formed from a resistor and a winding connected in series, where the driving circuit is to be part of a haptic actuator.
Figure 5B:
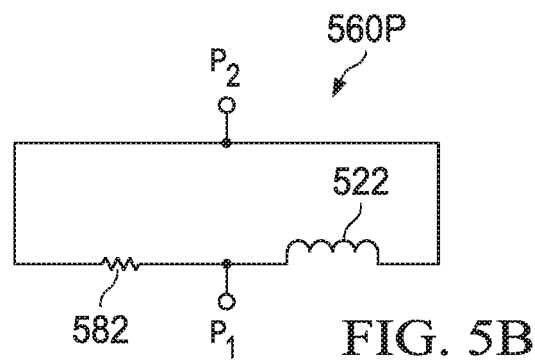
FIG. 5B shows a driving circuit formed from a resistor and a winding connected in parallel, where the driving circuit is to be part of a haptic actuator.

FIG. 5A shows an implementation 560S of a structure which can replace the double-wound driving coil 220S, which has two coils 222, 224 wound together and connected in series, for which a ratio N of resistances of the coils 222, 224 is different from a ratio M of efficiencies associated with the series-connected coils 222, 224, like the ones described above. FIG. 5B shows an implementation 560P of a structure which can replace the double-wound driving coil 220P, which has two coils 222, 224 wound together and connected in parallel, for which a ratio M of efficiencies associated with the coils 222, 224 is different from a product of a ratio N of resistances of the coils 222, 224 and a ratio I1/I2 of respective measured driving currents through the parallel-connected coils 222, 224, like the ones described above.

Instead, each of the implementations 560S, 560P of the structure illustrated in FIGS. 5A-5B includes a single coil 522 and a resistor 582 connected with each other. Here, M=0 since the resistor 582 has zero turns. Note that either of the implementations 560S, 560P of the structure illustrated in FIGS. 5A-5B can be used to drive the LRA 100 when it is acceptable that the resistor 582 does not provide motor driving, only power loss. Also either of the implementations 560S, 560P of the structure illustrated in FIGS. 5A-5B can be used to drive the LRA 100 when it is acceptable that it might be hard to ensure that the resistor 582 tracks the temperature of the coil 522. As long as a resistance of the resistor 582 will track the temperature variation of the coil 522, each of the implementations 560S, 560P of the structure can be used to determine the bEMF induced in the coil 522, as explained below.

Referring now to FIGS. 5A and 2A, the coil 522 and the resistor 582 are connected with each other in series, and the driver circuitry 265 can drive a driving current I through the implementation 560S of the structure. Also, the first voltage sensing circuitry 272 can sense a first driving voltage $V_1$ across the resistor 582, and the second voltage circuitry 274 can sense a second driving voltage $V_2$ across the coil 522.

Since neither $R_1$ nor $R_2$ are zero, then N≠0. In this manner, the above-noted bEMF-computing module is further configured to use EQ. (12) to determine the bEMF induced in the coil 522 in the following manner:

$$V_{bEMF} = \frac{NV_2 - V_1}{N}. \quad (16)$$

The implementation 560S of the structure illustrated in FIG. 5A is configured such that the ratio N of the resistance $R_1$ of the resistor 582 to the resistance $R_2$ of the coil 522 ensures that the denominator of EQ. (16) is different from zero. In this manner, real-time bEMF sensing is achieved independent of the value of the current I supplied through the resistor 582 and the coil 522, and thus it will be insensitive to load. Additionally, real-time bEMF sensing may be achieved independent of the resistance $R_1$ of the resistor 582 and the resistance $R_2$ of the coil 522, and thus it could be insensitive to temperature variations.

Referring now to FIGS. 5B and 2B, the coil 522 and the resistor 582 are connected with each other in parallel, and the driver circuitry 265' can provide a driving voltage V across the implementation 560P of the structure. Also, the first current sensing circuitry 272' can sense a first driving current $I_1$ through the resistor 582, and the second current sensing circuitry 274' can sense a second driving current $I_2$ through the coil 582.

Since neither $R_1$ nor $R_2$ are zero, then both the ratio N of the resistance $R_1$ of the resistor 582 to the resistance $R_2$ of the coil 522, and the ratio $I_1/I_2$ of the currents measured there through are non-zero. In this manner, the above-noted bEMF-computing module is further configured to use EQ. (15) to determine the bEMF induced in the coil 522 in the following manner:

$$V_{bEMF_2} = V\left(1 - \frac{1}{N\frac{I_1}{I_2}}\right). \quad (17)$$

The implementation 560P of the structure illustrated in FIG. 5B is configured such that the ratio N of the resistance $R_1$ of the resistor 582 to the resistance $R_2$ of the coil 522, and the ratio $I_1/I_2$ of the currents measured there through ensure that the denominator of EQ. (17) is different from zero. In this manner, real-time bEMF sensing is achieved independent of the resistance $R_1$ of the resistor 582 and the resistance $R_2$ of the coil 522, and thus it could be insensitive to temperature variations.

Figure 6:
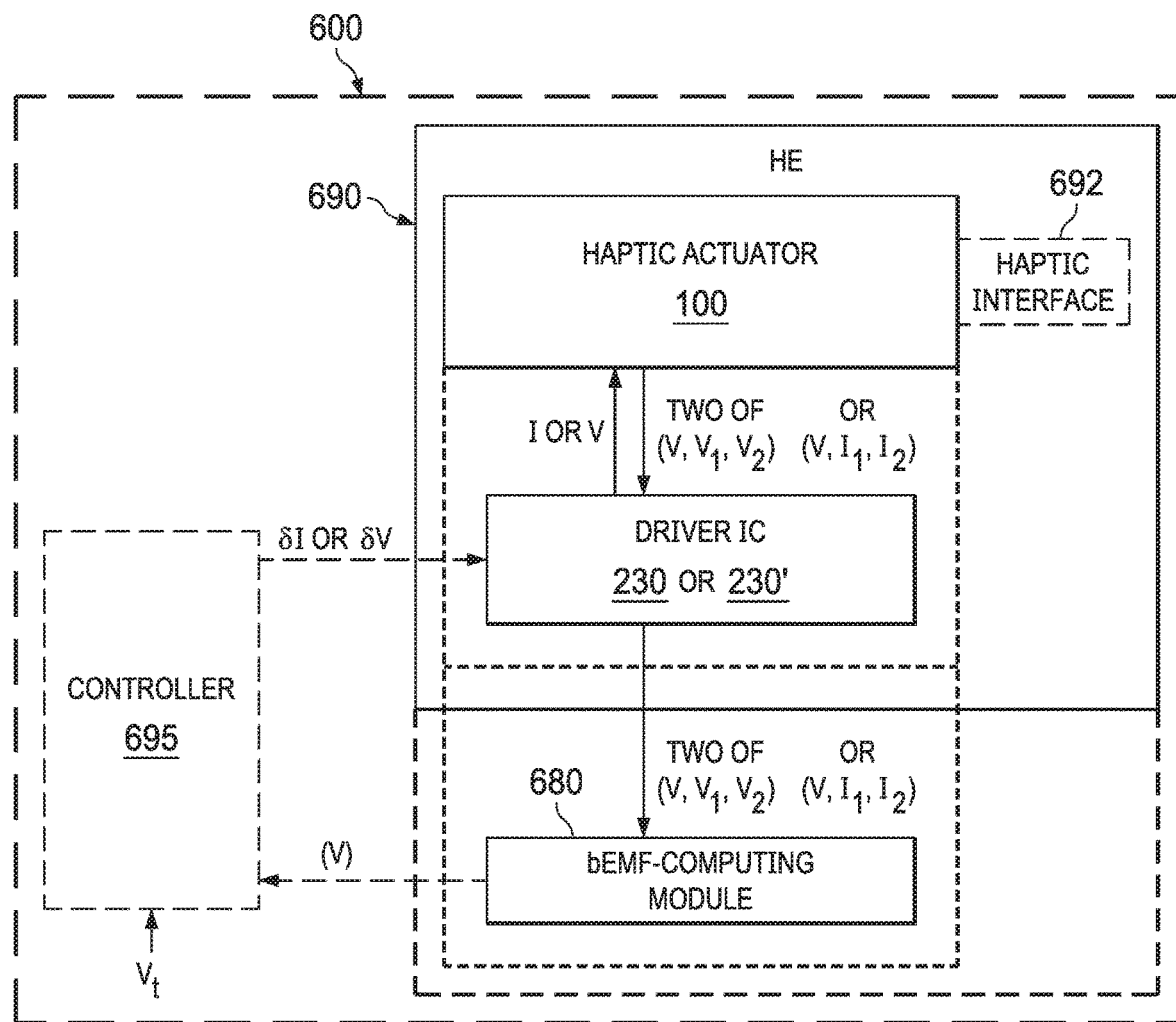
FIG. 6 is an example of computing device architecture that uses a haptic engine including the disclosed haptic actuator.
Figure 8:
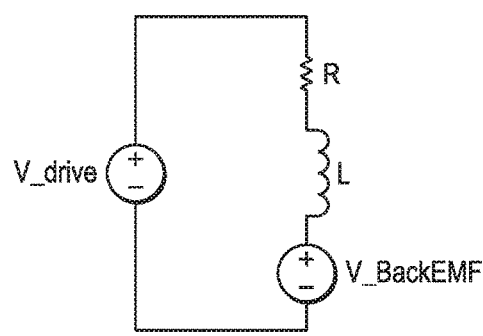
FIG. 8 shows an equivalent electrical circuit of an LRA having a conventional driving coil.

FIG. 6 shows a haptic engine 690 which includes the haptic actuator 100, either the driver IC 230 or the driver IC 230', and the above-noted bEMF-computing module, here having the reference numeral 680. Note that, depending on the implementation, both, one, or none of the driver IC 230/230' and the bEMF-computing module 680 are disposed inside the frame 102 of the haptic actuator 100. Correspondingly, none, one, or both of the driver IC 230/230' and the bEMF-computing module 680 can be disposed inside the frame 102 of the haptic actuator 100.

In some of the implementations described above, the driver IC 230 is configured to supply, or drive using a driving voltage V, depending on the implementation of the driver circuitry 265, a driving current I to the series-connected first and second coils 122, 124 or 322, 324 or 422, 424 of the double-wound driving coil 120 or 320 or 420 of the haptic actuator 100. Further, the driver IC 230 is configured to sense with the first voltage sensing circuitry 272, and then transmit to the bEMF-computing module 680, the values of the first driving voltage $V_1$ across the first coil 122 or 322 or 422, or the values of the driving voltage V across the double-wound driving coil 120S or 320S or 420, and to sense with the second voltage sensing circuitry 274, and then transmit to the bEMF-computing module 680, either the values of the second driving voltage $V_2$ across the second coil 124P or 324P or 424P, or the values of the driving voltage V across the double-wound driving coil 120S or 320S or 420, in a non-duplicated manner.

When the haptic actuator 100 is implemented as an LRA (e.g., like in FIG. 1A), the bEMF-computing module 680 is configured to determine the back EMF voltage induced in the series-connected first and second coils 122, 124 in accordance with EQs. (7) and (12) if the LRA 100 is equipped with one of the double-wound driving coil 120S or 320S or 420, or EQs. (7) and (16) if the LRA 100 is equipped with the implementation 560S of the structure illustrated in FIG. 5A.

In other of the implementations described above, the driver IC 230' is configured to use a driving voltage V, or a driving current, depending on the implementation of the driver circuitry 265', to supply respective driving currents $I_1$ and $I_2$ through the parallel-connected first and second coils 122, 124 or 322, 324 or 422, 424 of the double-wound driving coil 120P or 320P or 420 of the haptic actuator 100. Further, the driver IC 230' is configured to sense with a voltage sensing circuitry of the driver circuitry 265', and then transmit to the bEMF-computing module 680, the values of the driving voltage V across the double-wound driving coil 120P or 320P or 420, and to sense with the first current sensing circuitry 272', and then transmit to the bEMF-computing module 680, the values of the first driving current across the first coil 122 or 322 or 422, and to sense with the second current sensing circuitry 274', and then transmit to the bEMF-computing module 680, the values of the second driving current $I_2$ across the second coil 124P or 324P or 424P.

When the haptic actuator 100 is implemented as an LRA (e.g., like in FIG. 1A), the bEMF-computing module 680 is configured to determine the back EMF voltage induced in the parallel-connected first and second coils 122, 124 or 322, 324 or 422, 424 in accordance with EQs. (7) and (15) if the LRA 100 is equipped with one of the double-wound driving coil 120P or 320P or 420, or EQs. (7) and (17) if the LRA 100 is equipped with the implementation 560P of the structure illustrated in FIG. 5B.

In either of the above-noted implementations, the bEMF-computing module 680 is configured to determine the velocity of the mass 105 of the LRA 100 by dividing the determined back EMF voltage induced in one of the first and second coils 122, 124 or 322, 324 or 422, 424 by a value of the motor constant of the corresponding coil.

FIG. 6 shows that the haptic engine 690 can be integrated in a device 600, for instance a smartphone, a tablet, a laptop or a watch. In the example illustrated in FIG. 6, the device 600 includes a haptic interface 692, and the haptic engine 690 is part of, or coupled with, the haptic interface 692. In this manner, vibration of the mass 105 causes the haptic interface 692 to produce a specified vibration.

The device 600 includes a controller 695, e.g., a CPU, an ASIC, etc., configured to receive, e.g., from an app executed or accessed by the device 600, a target velocity signal, denoted in FIG. 6 as $v_t$, corresponding to a vibration to be produced by the haptic interface 692. Here, the controller 695 is coupled with both the driver IC 230/230' and the bEMF-computing module 680 of the haptic engine 690. The bEMF-computing module 680 is configured to transmit to the controller 695 the velocity signal v determined by the bEMF-computing module 680 and corresponding to the instant velocity of the mass 105 of the haptic actuator 100. In this example, the controller 695 is configured to compare the determined velocity signal v to the target velocity signal $v_t$. The controller 695 is configured to instruct the driver IC 230/230', based on the comparison, to implement current adjustments δI of the driving current supplied by the driver circuitry 265/265' through the double-wound driving coil 120S/P or 320S/P or 420, or voltage adjustments δV of the driving voltage supplied by the driver circuitry 265/265' across the double-wound driving coil 120S or 320S or 420, depending on the implementation of the driver circuitry 265/265'.

In summary, the disclosed haptic engines (e.g., 690) include, in one embodiment, a haptic actuator (e.g., implemented as the LRA 100) having a coil (e.g., 120S or 320S or 420) with two windings (e.g., 122, 124 or 322, 324 or 422, 424) connected in series to each other and wound together around a common core (121). A first ratio $$N = \frac{R_1}{R_2}$$

of the resistances of a first (122 or 322 or 422) of the two windings and second (124 or 324 or 424) of the two windings is different from a second ratio $$M = \frac{N_1}{N_2}$$

of the numbers of turns of the first winding (122 or 322 or 422) and the second winding (124 or 324 or 424). Methods for determining bEMF using the disclosed haptic engines were described. The disclosed methods include supplying an AC current (I) through the two series-connected windings (122, 124 or 322, 324 or 422, 424); sensing a first voltage ($V_1$) across the first winding (122 or 322 or 422); sensing a second voltage ($V_2$) across the second winding (124 or 324 or 424); and computing a first bEMF induced in the first winding (122 or 322 or 422) or a second bEMF induced in the second winding (124 or 324 or 424). Each of the first bEMF and the second bEMF is computed independently of resistances of either the first winding (122 or 322 or 422) or the second winding (124 or 324 or 424), and the driving current through the two windings (122, 124 or 322, 324 or 422, 424), and dependently of the first driving voltage over the first winding (122 or 322 or 422) and the second driving voltage over the second winding (124 or 324 or 424), and the first and second ratios (N, M).

It was shown that computing the first bEMF or the second bEMF is performed in accordance with the following expressions:

$$bEMF_2 = \frac{NV_2 - V_1}{N - M}, \text{ and}$$

$$bEMF_1 = M \cdot bEMF_2.$$

In another embodiment, the disclosed haptic engines (e.g., 690) include, a haptic actuator (e.g., implemented as the LRA 100) having a resistor (582) and a coil (522) wound around the resistor (582), the coil (522) and the resistor being connected in series. Methods for determining bEMF using the disclosed haptic engines were described. The disclosed methods include supplying an AC current through the series-connected resistor (582) and coil (522); sensing a first voltage ($V_1$) across the resistor; sensing a second voltage ($V_2$) across the coil; and computing a bEMF induced in the coil. The bEMF is computed independently of resistances of either the resistor (582) or the coil (522), and the AC current through the resistor (582) and the coil (522), and dependently of the first voltage ($V_1$) over the resistor (582) and the second voltage ($V_2$) over the coil (522), and a ratio $$N = \frac{R_1}{R_2}$$

of the resistances of the resistor (582) and the coil (522).

It was shown that computing the bEMF is performed in accordance with the following expression:

$$bEMF = \frac{NV_2 - V_1}{N}$$

In yet another embodiment, the disclosed haptic engines (e.g., 690) include a haptic actuator (e.g., implemented as the LRA 100) having a coil (e.g., 120P or 320P or 420) with two windings (e.g., 122, 124 or 322, 324 or 422, 424) connected in parallel to each other and wound together around a common core (121). A first ratio $$M = \frac{N_1}{N_2}$$

of the numbers of turns of a first (122 or 322 or 422) of the two windings and a second (124 or 324 or 424) of the two windings is different from a second ratio $$N = \frac{R_1}{R_2}$$

of the resistances of the first winding (122 or 322 or 422) and the second winding (124 or 324 or 424). Methods for determining bEMF using the disclosed haptic engines were described. The disclosed methods include supplying an AC voltage (V) across the two parallel-connected windings (122, 124 or 322, 324 or 422, 424) to induce respective currents $I_1$ and $I_2$; sensing a first current ($I_1$) through the first winding (122 or 322 or 422); sensing a second current ($I_2$) through the second winding (124 or 324 or 424); and computing a first bEMF induced in the first winding (122 or 322 or 422) or a second bEMF induced in the second winding (124 or 324 or 424). Each of the first bEMF and the second bEMF is computed independently of resistances of either the first winding (122 or 322 or 422) or the second winding (124 or 324 or 424), and dependently of the AC voltage (V) across the two parallel-connected windings (122, 124 or 322, 324 or 422, 424), a third ratio $I_1/I_2$ of the first current through the first winding (122 or 322 or 422) to the second current through the second winding (124 or 324 or 424), and the first and second ratios (N, M).

It was shown that computing the first bEMF or the second bEMF is performed in accordance with the following expressions:

$$bEMF_2 = V \frac{1 - N\frac{I_1}{I_2}}{M - N\frac{I_1}{I_2}}, \text{ and}$$

$$bEMF_1 = M \cdot bEMF_2.$$

In yet another embodiment, the disclosed haptic engines (e.g., 690) include, a haptic actuator (e.g., implemented as the LRA 100) having a resistor (582) and a coil (522) wound around the resistor (582), the coil (522) and the resistor being connected in parallel. Methods for determining bEMF using the disclosed haptic engines were described. The disclosed methods include supplying an AC voltage across the parallel-connected resistor (582) and coil (522); sensing a first current ($I_1$) through the resistor; sensing a second current ($I_2$) through the coil; and computing a bEMF induced in the coil. The bEMF is computed independently of resistances of either the resistor (582) or the coil (522), and dependently of the AC voltage across the parallel-connected resistor (582) and coil (522), a first ratio $I_1/I_2$ of the first current through the resistor (582) and the second current through the coil (522), and a second ratio $$N = \frac{R_1}{R_2}$$

of the resistances of the resistor (582) and the coil (522).

It was shown that computing the bEMF is performed in accordance with the following expression:

$$bEMF = V\left(1 - \frac{1}{N\frac{I_1}{I_2}}\right).$$

FIG. 7 is a diagram of an example of mobile device architecture that uses the haptic engine 690 described in reference to FIGS. 1-6, according to an embodiment. Architecture 700 may be implemented in any mobile device for generating the features and processes described in reference to FIGS. 1-6, including but not limited to smart phones and wearable computers (e.g., smart watches, fitness bands). Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor(s) 710, light sensor 712, and proximity sensor 714 may be coupled to peripherals interface 706 to facilitate orientation, lighting, and proximity functions of the device. For example, in some embodiments, light sensor 712 may be utilized to facilitate adjusting the brightness of touch surface 746. In some embodiments, motion sensor(s) 710 (e.g., an accelerometer, rate gyroscope) may be utilized to detect movement and orientation of the device. Accordingly, display objects or media may be presented according to a detected orientation (e.g., portrait or landscape).

Haptic engine 717, under the control of haptic engine instructions 772, provides the features and performs the processes described in reference to FIGS. 1-6, such as, for example, implementing haptic feedback (e.g., vibration). Haptic engine 717 can include one or more actuators, such as piezoelectric transducers, electromechanical devices, and/or other vibration inducing devices, which are mechanically connected to an input surface (e.g., touch surface46). Drive electronics (e.g., 230) coupled to the one or more actuators cause the actuators to induce a vibratory response into the input surface, providing a tactile sensation to a user touching or holding the device.

Other sensors may also be connected to peripherals interface 706, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 717 can be used as a temperature sensor.

Location processor 715 (e.g., GNSS receiver chip) may be connected to peripherals interface 706 to provide georeferencing. Electronic magnetometer 716 (e.g., an integrated circuit chip) may also be connected to peripherals interface 706 to provide data that may be used to determine the direction of magnetic North. Thus, electronic magnetometer 716 may be used to support an electronic compass application.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communications functions may be facilitated through one or more communication subsystems 724. Communication subsystem(s) 724 may include one or more wireless communication subsystems. Wireless communication subsystems 724 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 724 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 724 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 726 may be coupled to a speaker 728 and one or more microphones 730 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 746. In one embodiment, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some embodiments, device 700 may present recorded audio and/or video files, such as MP3, AAC, and MPEG video files. In some embodiments, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, iOS, WINDOWS, or an embedded operating system such as VxWorks. Operating system 752 may include instructions for handling basic system services and for performing hardware dependent tasks. In some embodiments, operating system 752 may include a kernel (e.g., UNIX kernel).

Memory 750 may also store communication instructions 754 to facilitate communicating with one or more additional devices, one or more computers or servers, including peer-to-peer communications. Communication instructions 754 may also be used to select an operational mode or communication medium for use by the device, based on a geographic location (obtained by the GPS/Navigation instructions 768) of the device.

Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS (e.g., GPS, GLOSSNAS) and navigation-related processes and functions; camera instructions 770 to facilitate camera-related processes and functions; and haptic engine instructions 772 for commanding or controlling haptic engine 717 and to provide the features and performing the processes described in reference to FIGS. 1-6.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A haptic engine comprising:
a frame;
a double-wound driving coil that is mechanically coupled with the frame and comprises a first coil and a second coil wound together around a common core and thermally coupled with each other, the first coil and the second coil being connected in series and having a common terminal, wherein a first ratio $$N = \frac{R_1}{R_2}$$

of resistances of the first coil and the second coil is different from a second ratio $$M = \frac{N_1}{N_2}$$

of a number of turns of the first coil and the second coil;
a driving source electrically coupled with the first coil at a first terminal different from the common terminal, and the second coil at a second terminal different from the common terminal to drive a driving current through the first coil and the second coil;
a first voltage sensor to sense a first driving voltage across the first coil when electrically coupled with the first coil at the first terminal and the common terminal;
a second voltage sensor to sense a second driving voltage across the second coil when electrically coupled with the second coil at the second terminal and the common terminal;
a mass supporting one or more permanent magnets, the mass arranged to be driven relative to the frame along a driving direction when the driving current is driven through the first coil and the second coil; and
computing circuitry configured to determine a velocity of the mass along the driving direction, the velocity determined
independently of resistances of either the first coil or the second coil, and the driving current through the first coil and the second coil, and
dependently of the first driving voltage over the first coil and the second driving voltage over the second coil, and the first and second ratios.

2. The haptic engine of claim 1, wherein the first coil and the second coil have the same numbers of turns and different resistances.

3. The haptic engine of claim 2, wherein
the first coil and the second coil have a same coil geometry, and are made from wire of a same material, and
the first coil has a first gauge, and the second coil has a second gauge different from the first gauge.

4. The haptic engine of claim 2, wherein
the first coil and the second coil are made from wire of the same material, and have the same gauge, and
the first coil has a first coil geometry, and the second coil has a second coil geometry different from the first coil geometry.

5. The haptic engine of claim 2, wherein
the first coil and the second coil have the same coil geometry and the same gauge, and
the first coil is made from a first material, and the second coil is made from a second material different from the first material.

6. The haptic engine of claim 1, wherein to determine the velocity, the computing circuitry is configured to
compute a first back electromotive force (bEMF) induced in the first coil or a second bEMF induced in the second coil, wherein each of the first bEMF and the second bEMF is computed independently of resistances of either the first coil or the second coil, and the driving current through the first coil and the second coil, and dependently of the first driving voltage over the first coil, and the second driving voltage over the second coil, and the first and second ratios, and
take a third ratio of the first bEMF to a first motor constant associated with the first coil, or a fourth ratio of the second bEMf to a second motor constant associated with the second coil.

7. The haptic engine of claim 1, wherein the driving source is configured to drive the driving current through the first coil and the second coil with frequencies in a frequency range of 10 Hz to 1 kHz, preferably 40 Hz to 300 Hz.

8. The haptic engine of claim 1, comprising
an integrated circuit, wherein the integrated circuit comprises
driver circuitry comprising the driving source configured as a driving-current source to supply the driving current through the first coil and the second coil,
first sensing circuitry comprising the first voltage sensor, and
second sensing circuitry comprising the second voltage sensor.

9. The haptic engine of claim 8, wherein the integrated circuit is disposed either inside or outside the frame.

10. The haptic engine of claim 8, wherein the computing circuitry is coupled with
the first sensing circuitry to receive values of the first driving voltage across the first coil sensed by the first voltage sensor, and
the second sensing circuitry to receive values of the second driving voltage across the second coil sensed by the second voltage sensor.

11. The haptic engine of claim 1, comprising
an integrated circuit comprising
driver circuitry comprising the driving source configured as a driving-voltage source to supply a driving voltage across the first coil and the second coil to induce the driving current through the first coil and the second coil.

12. The haptic engine of claim 11, wherein
the driver circuitry comprises the first voltage sensor to sense the driving voltage across the first coil and the second coil when electrically coupled with the first coil and the second coil at the first terminal and the second terminal, and
the integrated circuit comprises sensing circuitry comprising the second voltage sensor to sense the second driving voltage across the second coil when electrically coupled with the second coil at the second terminal and the common terminal.

13. The haptic engine of claim 11, wherein
the driver circuitry comprises the second voltage sensor to sense the driving voltage across the first coil and the second coil when electrically coupled with the first coil and the second coil at the first terminal and the second terminal, and the integrated circuit comprises sensing circuitry comprising the first voltage sensor to sense the first driving voltage across the first coil when electrically coupled with the first coil at the first terminal and the common terminal.

14. The haptic engine of claim 1, wherein the computing circuitry is disposed either inside or outside the frame.

15. A method for determining back electromagnetic force (bEMF) using a coil with two windings wound together around a common core, the two windings connected in series, wherein a first ratio $$N = \frac{R_1}{R_2}$$

of resistances of a first of the two windings and second of the two windings is different from a second ratio $$M = \frac{N_1}{N_2}$$

of a numbers of turns of the first winding and the second winding, the method comprising:
 driving an AC current through the two windings;
 sensing a first voltage across the first winding;
 sensing a second voltage across the second winding; and
 computing a first bEMF induced in the first winding or a second bEMF induced in the second winding, wherein each of the first bEMF and the second bEMF is computed
  independently of resistances of either the first winding or the second winding, and the driving current through the two windings, and
  dependently of the first driving voltage over the first winding and the second driving voltage over the second winding, and the first and second ratios.

16. The method of claim 15, wherein driving the AC current through the two windings comprises supplying a driving voltage across the two windings.

17. The method of claim 15, wherein driving the AC current through the two windings comprises supplying the AC current through the two windings.

18. The method of claim 15, wherein computing the first bEMF or the second bEMF is performed in accordance with the following expressions:

$$bEMF_2 = \frac{NV_2 - V_1}{N - M}, \text{ and}$$
$$bEMF_1 = M \cdot bEMF_2.$$

19. The method of claim 17, wherein the AC current through the two windings is driven with frequencies in a frequency range of 10 Hz to 1 kHz, preferably 40 Hz to 300 Hz.

20. A method for determining back electromagnetic force (bEMF) using a resistor and a coil wound around the resistor, the coil and the resistor being connected in series, the method comprising:
 driving an AC current through the resistor and the coil;
 sensing a first voltage across the resistor; and
 sensing a second voltage across the coil; and
 computing a bEMF induced in the coil, wherein the bEMF is computed
  independently of resistances of either the resistor or the coil, and the AC current through the resistor and the coil, and
  dependently of the first voltage over the resistor and the second voltage over the coil, and a ratio $$N = \frac{R_1}{R_2}$$

of resistances of the resistor and the coil.

21. The method of claim 20, wherein driving the AC current through the resistor and the coil comprises supplying a driving voltage across the resistor and the coil.

22. The method of claim 20, wherein driving the AC current through the resistor and the coil comprises supplying the AC current through the resistor and the coil.

23. The method of claim 20, wherein computing the bEMF is performed in accordance with the following expression:

$$bEMF = \frac{NV_2 - V_1}{N}$$

24. The method of claim 20, wherein the AC current through the resistor and the coil is driven with frequencies in a frequency range of 40 Hz to 300 Hz.

25. A haptic engine comprising:
 a frame;
 a double-wound driving coil that is mechanically coupled with the frame and comprises a first coil and a second coil wound together around a common core and thermally coupled with each other, the first coil and the second coil being connected in parallel at common terminals;
 a driving source electrically coupled with the parallel-connected first coil and second coil to drive a driving voltage across the parallel-connected first coil and second coil;
 a voltage sensor electrically coupled with the parallel-connected first coil and second coil to sense the driving voltage across the parallel-connected first coil and second coil;
 a first current sensor electrically coupled with the first coil to sense a first driving current caused through the first coil by the driving voltage;
 a second current sensor electrically coupled with the second coil to sense a second driving current caused through the second coil by the driving voltage, wherein a first ratio $$M = \frac{N_1}{N_2}$$

of a numbers of turns of the first coil and the second coil is different from a product of a second ratio $$N = \frac{R_1}{R_2}$$

of resistances of the first coil and the second coil and a third ratio $$\frac{I_1}{I_2}$$

of the sensed first and second currents;
a mass supporting one or more permanent magnets, the mass arranged to be driven relative to the frame along a driving direction when the driving voltage is supplied across the parallel-coupled first coil and the second coil; and
computing circuitry configured to determine a velocity of the mass along the driving direction, the velocity determined
  independently of resistances of either the first coil or the second coil, and
  dependently of the values of the driving voltage, and the first, second, and third ratios.

26. The haptic engine of claim 25, wherein the first coil and the second coil have the same numbers of turns and different resistances.

27. The haptic engine of claim 26, wherein
the first coil and the second coil have the same coil geometry, and are made from wire of the same material, and
the first coil has a first gauge, and the second coil has a second gauge different from the first gauge.

28. The haptic engine of claim 26, wherein
the first coil and the second coil are made from wire of the same material, and have the same gauge, and
the first coil has a first coil geometry, and the second coil has a second coil geometry different from the first coil geometry.

29. The haptic engine of claim 26, wherein
the first coil and the second coil have the same coil geometry and the same gauge, and
the first coil is made from a first material, and the second coil is made from a second material different from the first material.

30. The haptic engine of claim 25, wherein to determine the velocity, the computing circuitry is configured to
compute a first back electromotive force (bEMF) induced in the first coil or a second bEMF induced in the second coil, wherein each of the first bEMF and the second bEMF is computed independently of resistances of either the first coil or the second coil, and dependently of the values of the driving voltage, and the first, second, and third ratios, and
take a fourth ratio of the first bEMF to a first motor constant associated with the first coil, or a fifth ratio of the second bEMF to a second motor constant associated with the second coil.

31. The haptic engine of claim 25, wherein the driving source is configured to drive the driving voltage across the parallel-connected first coil and second coil with frequencies in a frequency range of 10 Hz to 1 kHz, preferably 40 Hz to 300 Hz.

32. The haptic engine of claim 25, comprising
an integrated circuit, wherein the integrated circuit comprises
  driver circuitry comprising the driving source configured as a driving-voltage source to supply the driving voltage across the parallel-connected first coil and second coil,
  first sensing circuitry comprising the first current sensor, and
  second sensing circuitry comprising the second current sensor.

33. The haptic engine of claim 32, wherein the driver circuitry comprises the voltage sensor.

34. The haptic engine of claim 33, wherein the computing circuitry is coupled with
the voltage sensor to receive values of the driving voltage across the parallel-connected first coil and second coil,
the first sensing circuitry to receive values of the first driving current through the first coil sensed by the first current sensor, and
the second sensing circuitry to receive values of the second driving current through the second coil sensed by the second current sensor.

35. The haptic engine of claim 32, wherein the integrated circuit is disposed either inside or outside the frame.

36. The haptic engine of claim 25, comprising
an integrated circuit, wherein the integrated circuit comprises
  driver circuitry comprising the driving source configured as a driving-current source to supply a driving current to induce the first driving current through the first coil and the second driving current through the second coil,
  first sensing circuitry comprising the first current sensor, and
  second sensing circuitry comprising the second current sensor.

37. The haptic engine of claim 36, wherein either the first sensing circuitry or the second sensing circuitry comprises the voltage sensor.

38. The haptic engine of claim 25, wherein the computing circuitry is disposed either inside or outside the frame.

39. A method for determining back electromagnetic force (bEMF) using a coil with two windings wound together around a common core, the two windings being connected in parallel, the method comprising:
supplying an AC voltage across the two parallel-connected windings;
sensing a first current through the first winding;
sensing a second current through the second winding, wherein a first ratio $$M = \frac{N_1}{N_2}$$

of a numbers of turns of a first of the two windings and a second of the two windings is different from a product of a second ratio $$N = \frac{R_1}{R_2}$$

of resistances of the first winding and the second winding to a third ratio $$\frac{I_1}{I_2}$$

of the sensed first and second currents; and computing a first bEMF induced in the first winding or a second bEMF induced in the second winding, wherein each of the first bEMF and the second bEMF is computed independently of resistances of either the first winding or the second winding, and dependently of the values of the AC voltage, and the first, second, and third ratios.

40. The method of claim 39, wherein computing the first bEMF or the second bEMF is performed in accordance with the following expressions:

$$bEMF_2 = V \frac{1 - N\frac{I_1}{I_2}}{M - N\frac{I_1}{I_2}}, \text{ and}$$

$$bEMF_1 = M \cdot bEMF_2.$$

41. The method of claim 39, wherein the AC voltage across the two parallel-connected windings is supplied with frequencies in a frequency range of 10 Hz to 1 kHz, preferably 40 Hz to 300 Hz.

42. A method for determining back electromagnetic force (bEMF) using a resistor and a coil wound around the resistor, the coil and the resistor being connected in parallel, the method comprising:

supplying an AC voltage through the parallel-connected resistor and coil;

sensing a first current through the resistor;

sensing a second current through the coil; and computing a bEMF induced in the coil, wherein the bEMF is computed independently of resistances of either the resistor or the coil, and dependently of the values of the AC voltage, a first ratio $$\frac{I_1}{I_2}$$

of the sense first and second currents, and a second ratio $$N = \frac{R_1}{R_2}$$

of the resistances of the resistor and the coil.

43. The method of claim 42, wherein computing the bEMF is performed in accordance with the following expression:

$$bEMF = V\left(1 - \frac{1}{N\frac{I_1}{I_2}}\right)$$

44. The method of claim 42, wherein the AC voltage across the parallel-connected resistor and coil is supplied with frequencies in a frequency range of 40 Hz to 300 Hz.

* * * * *

UNITED STATES PATENT AND TRADEMARK OFFICE
CERTIFICATE OF CORRECTION

| | | |
|---|---|---|
| PATENT NO. | : 11,527,946 B2 | Page 1 of 1 |
| APPLICATION NO. | : 16/900718 | |
| DATED | : December 13, 2022 | |
| INVENTOR(S) | : Riccardo Tarelli, Yumeng Liu and Shingo Yoneoka | |

It is certified that error appears in the above-identified patent and that said Letters Patent is hereby corrected as shown below:

In the Claims

Column 30, Line 18, In Claim 6, delete "bEMf" and insert -- bEMF --;

Column 31, Line 57, In Claim 19, delete "17," and insert -- 15, --;

Column 32, Line 25-27 (Approx.), In Claim 23, after " " insert -- . --;

Column 36, Line 12 (Approx.), In Claim 42, delete "sense" and insert -- sensed --; and Column 36, Line 25-27 (Approx.), In Claim 43, after " " insert -- . --.

Signed and Sealed this
Twenty-eighth Day of March, 2023

Katherine Kelly Vidal
*Director of the United States Patent and Trademark Office*